United States Patent
Yu et al.

(10) Patent No.: US 10,360,677 B2
(45) Date of Patent: Jul. 23, 2019

(54) APPARATUS AND METHOD FOR JOINT-EDGE-PRESERVING REGULARIZATION TO REDUCE NOISE IN FOUR-DIMENSIONAL COMPUTED TOMOGRAPHY IMAGES

(71) Applicant: Toshiba Medical Systems Corporation, Otawara-shi (JP)

(72) Inventors: Zhou Yu, Wilmette, IL (US); Yan Liu, Vernon Hills, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 15/288,200

(22) Filed: Oct. 7, 2016

(65) Prior Publication Data
US 2018/0101948 A1    Apr. 12, 2018

(51) Int. Cl.
*G06K 9/00*    (2006.01)
*G06T 7/00*    (2017.01)
(Continued)

(52) U.S. Cl.
CPC ............ *G06T 7/0012* (2013.01); *G06T 5/002* (2013.01); *G06T 11/003* (2013.01);
(Continued)

(58) Field of Classification Search
None
See application file for complete search history.

(56) References Cited

U.S. PATENT DOCUMENTS 8,233,586 B1    7/2012   Boas
9,082,167 B2    7/2015   Bruder et al.
(Continued)

FOREIGN PATENT DOCUMENTS

CN        1042687914 A     1/2015
WO    WO 2013/011418 A2   1/2013
WO    WO 2014080311 A1    5/2014

OTHER PUBLICATIONS

W. Huh and J. A. Fessler, "Iterative image reconstruction for dual-energy x-ray CT using regularized material sinogram estimates", 2011 IEEE International Symposium on Biomedical Imaging: From Nano to Macro, 2011.
(Continued)

*Primary Examiner* — Stephen P Coleman
(74) *Attorney, Agent, or Firm* — Oblon, McClelland, Maier & Neustadt, L.L.P.

(57) ABSTRACT

A method and apparatus is provided to denoise computed tomography (CT) sinograms and reconstructed images by minimizing a penalized-weighted-least-squares objective function that includes a joint-edge-preserving regularization term. Common information shared among a series of related image and/or sinograms can beneficially be used to more accurately identify edges common to all of the image and/or sinograms. Thus, a joint edge preserving regularizer that relies on information from a series of three-dimensional constituents of a four-dimensional image, such as a time series of images in a CT profusion study or an energy series of images in spectral CT, can improve image quality by better preserving edges while simultaneously denoising the constituent images.

19 Claims, 16 Drawing Sheets

(51) Int. Cl.
G06T 5/00 (2006.01)
G06T 11/00 (2006.01)

(52) U.S. Cl.
CPC .. *G06T 11/008* (2013.01); *G06T 2207/10081* (2013.01); *G06T 2207/10116* (2013.01); *G06T 2207/20192* (2013.01); *G06T 2207/30004* (2013.01)

(56) References Cited

U.S. PATENT DOCUMENTS

| | | | | |
|---|---|---|---|---|
| 2003/0076988 | A1* | 4/2003 | Liang | G06T 5/10 382/131 |
| 2011/0286651 | A1* | 11/2011 | Yu | G06T 11/005 382/131 |
| 2015/0131883 | A1 | 5/2015 | Taguchi et al. | |

OTHER PUBLICATIONS

K. M. Brown, S. Zabic, and G. Shechter, "Impact of Spectral Separation in Dual-Energy CT with Anti-Correlated Statistical Reconstruction", The 13th International Meeting on Fully Three-Dimensional Image Reconstruction in Radiology and Nuclear Medicine, 2015.

H. Zhang et al Statistical image reconstruction for low-dose CT using nonlocal means-based regularization, Comput Med Imaging Graph. Sep. 2014.

Seong-Wook Jang et al, Computed Tomographic Image Analysis Based on FEM Performance Comparison of Segmentation on Knee Joint Reconstruction, Hindawi Publishing Corporation ☐e Scientific World Journal. vol. 2014, Article ID 235858, 11 pageshttp://dx.doi.org/10.1155/2014/235858.

Yan Liu and Zhou Yu, A joint iterative reconstruction algorithm for dual energyCT using ADMM, The 13th International Meeting on Fully Three-Dimensional Image Reconstruction in Radiology and Nuclear Medicine.

* cited by examiner

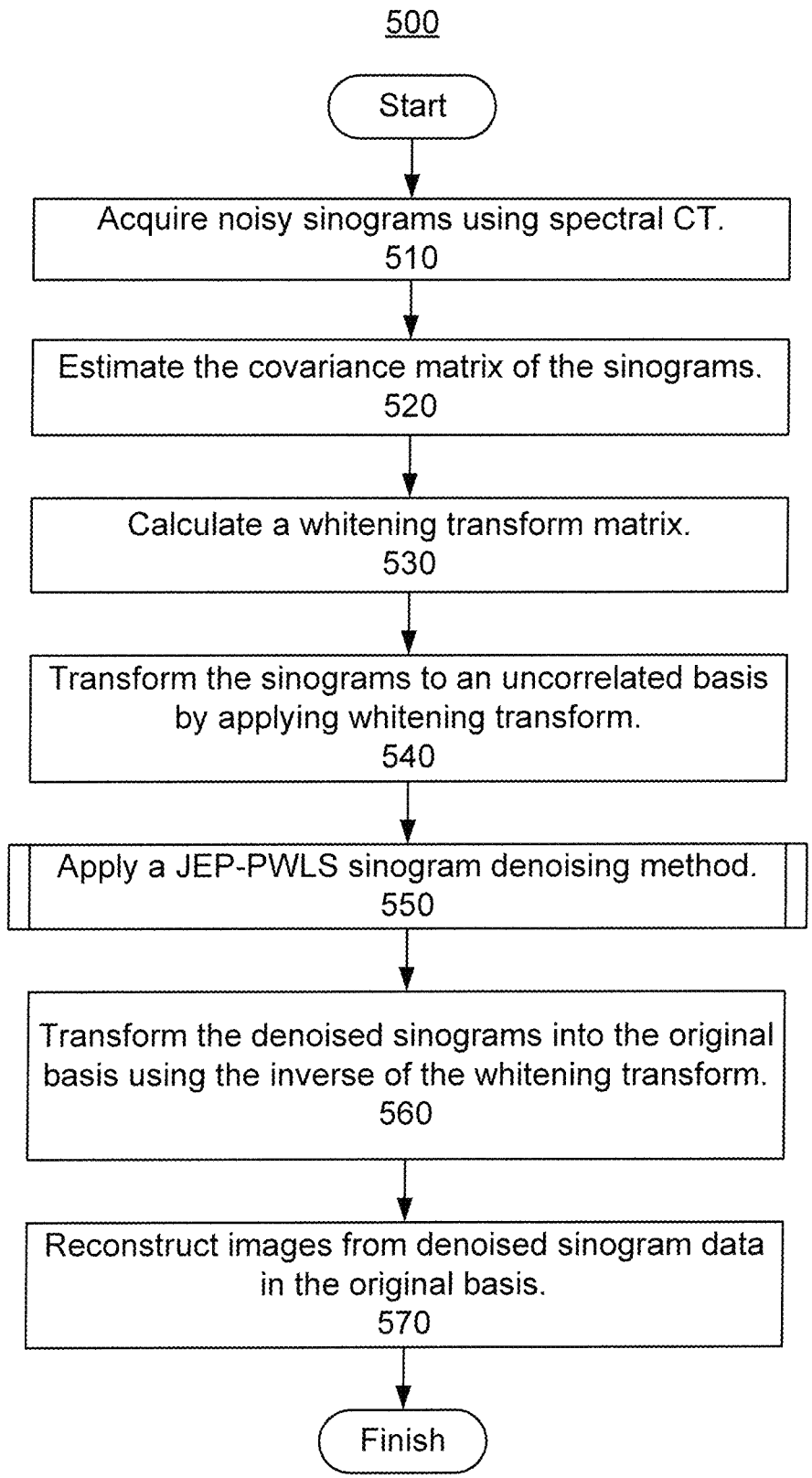

APPARATUS AND METHOD FOR JOINT-EDGE-PRESERVING REGULARIZATION TO REDUCE NOISE IN FOUR-DIMENSIONAL COMPUTED TOMOGRAPHY IMAGES

FIELD

This disclosure relates to denoising of sinograms and/or reconstructed images in computed tomography (CT) by optimizing an objective function that includes a joint-edge-preserving term, and, more particularly, to denoising sinograms and/or reconstructed images represented in a series of sinograms/images sharing common structures and features expressed in the joint-edge-preserving term.

BACKGROUND

Computed tomography (CT) systems and methods are widely used, particularly for medical imaging and diagnosis. CT systems generally create images of one or more sectional slices through a subject's body. A radiation source, such as an X-ray source, irradiates the body from one side. At least one detector on the opposite side of the body receives radiation transmitted through the body. The attenuation of the radiation that has passed through the body is measured by processing electrical signals received from the detector.

A CT sinogram indicates attenuation through the body as a function of position along a detector array and as a function of the projection angle between the X-ray source and the detector array for various projection measurements. In a sinogram, the spatial dimensions refer to the position along the array of X-ray detectors. The time/angle dimension refers to the projection angle of X-rays, which changes as a function of time during a CT scan. The attenuation resulting from a portion of the imaged object (e.g., a vertebra) will trace out a sine wave around the vertical axis. Those portions farther from the axis of rotation correspond to sine waves with larger amplitudes, and the phase of the sine waves correspond to the angular positions of objects around the rotation axis. Performing an inverse Radon transform—or any other image reconstruction method—reconstructs an image from the projection data in the sinogram.

In some CT modalities, such as in a profusion study, a time series of reconstructed images can be obtained. Additionally, in spectral CT, X-rays having various energies are propagated through a patient and variously detected (e.g., using an energy resolving detector such as a photon-counting detector) and reconstructed images can be obtained at each respective energy. Alternatively, the energy resolved projection data can be decomposed into material components corresponding to high-Z atoms and low-Z atoms. For example, in a patient image the two material components can be bone and water, wherein the water component includes tissues and fluid primarily composed of water such as blood and soft tissue.

To obtain the spectral nature of the transmitted X-ray data, the photon-counting detectors differentiate between the X-rays having different energies by resolving detected X-rays into energy bins and counting the number of X-rays in each of the bins along each detector element of the detector array. Since spectral CT involves the detection of transmitted X-rays at two or more energy levels, spectral CT generally includes dual-energy CT by definition. Because different materials (i.e., materials having high-Z atoms and low-Z atoms, respectively) exhibit different spectral attenuation signatures for X-rays, spectral-CT projection data can be decomposed into material components using a material-decomposition method. The material-component images can then be reconstructed from material-component sinograms.

Whether spectral CT sinograms or reconstructed images are expressed using an energy-bin basis or a material-component basis, the sinograms and/or images can be thought of a three-dimensional representations, snapshots, or constituents of a four-dimensional image in which the fourth dimension is either X-ray energy or material component.

Similarly, in certain medical imaging modalities, CT images can be taken at a series of times to observe changes as a function of time. For example, in a profusion study, a contrast agent can be injected into a blood stream of a patient shortly after a first CT scan in a time series of multiple CT scans to observe the dynamics of blood flow through the patient. In this case, the sinograms and/or reconstructed images are three-dimensional constituents of a four-dimensional image having time as its fourth dimension.

In both cases mentioned above and many others involving four-dimensional images in medical imaging, the three-dimensional constituents of a four-dimensional image have significant common features and structure among the respective three-dimensional constituents. Thus, conventional denoising methods, which denoise the respective three-dimensional constituents separately, are underutilizing common information and signals among the respective three-dimensional constituents that could be used to denoise the three-dimensional constituents without sacrificing resolution in order to improve the image quality of the four-dimensional images.

BRIEF DESCRIPTION OF THE DRAWINGS

A more complete understanding of this disclosure is provided by reference to the following detailed description when considered in connection with the accompanying drawings, wherein:

FIG. 5 shows a flow diagram of a method of denoising a series of sinograms using an objective function having joint-edge-preserving term, according to one implementation;

DETAILED DESCRIPTION

Figure 1:
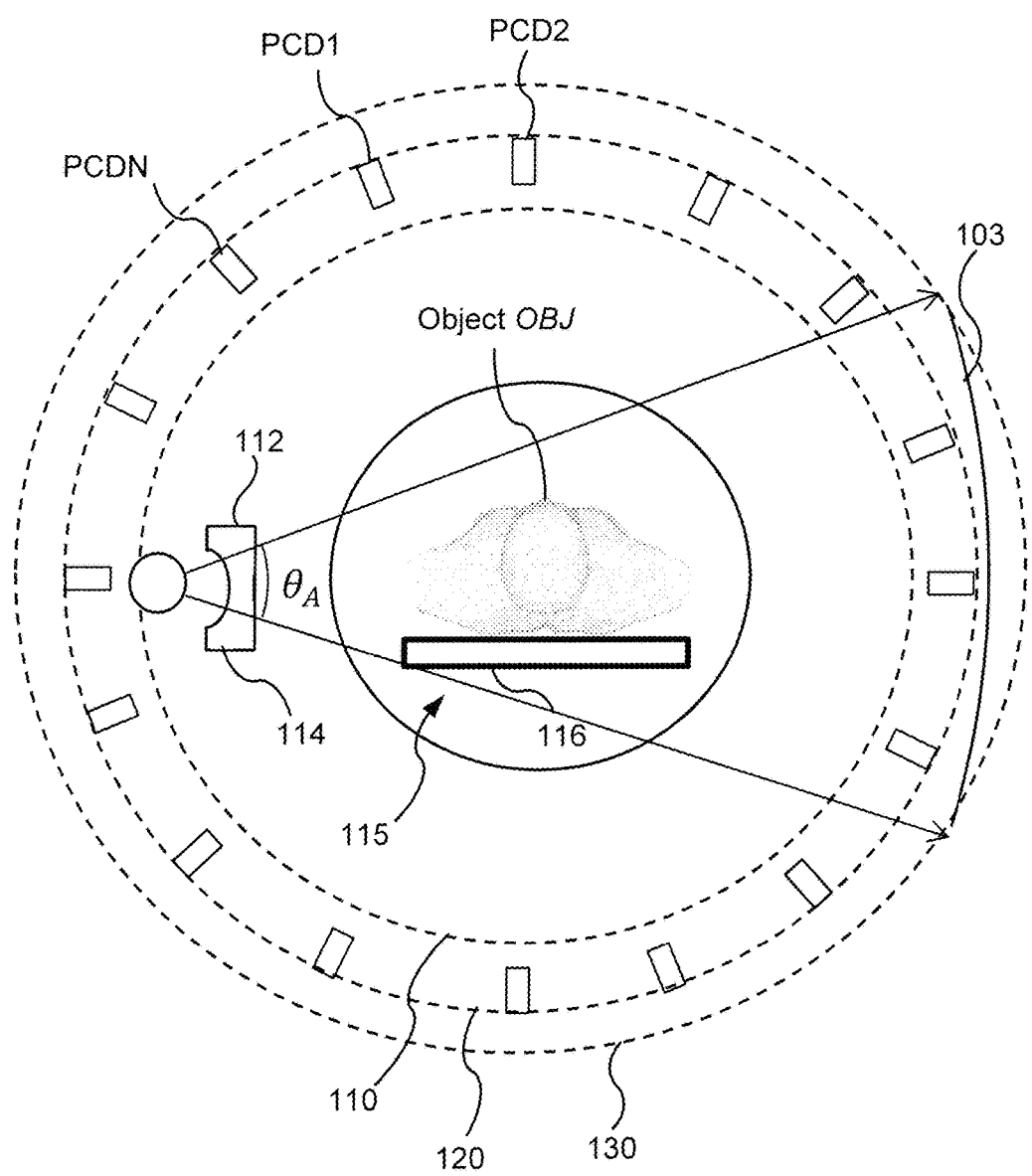
FIG. 1 shows a schematic of an implementation of an arrangement of X-ray source and X-ray detectors for a CT scanner.

Many clinical imaging procedures, such as a profusion study using computed tomography (CT), produce four-dimensional images. For example, four-dimensional images can include any series of three-dimensional images arranged along a fourth dimension such as time or energy. For example, the fourth dimension can be an X-ray energy spectrum as in spectral CT, or the fourth dimension can be time as in a CT profusion study. Many types of four-dimensional images are encountered in medical imaging, including: a time series of three-dimensional images such as those encountered in profusion studies using contrast agents, digital subtraction angiography (DSA), dynamic positron emission tomography (PET), cardiac computed tomography (CT), and spectral resolved CT measurements such as those encountered in dual-energy CT using material decomposition.

Generally, each constituent three-dimensional image in a four-dimensional image shares significant information and has a common structure with the other three-dimensional images of the four-dimensional image. However, conventional methods of denoising four-dimensional images underutilize the common structure between the constituent three-dimensional images. For example, conventional methods can denoise each three-dimensional image separately. Thus, conventional methods of denoising four-dimensional images fail to optimally use the redundant information from the three-dimensional images, and thus these conventional methods can be improved to better denoise the respective three-dimensional images without sacrificing resolution by blurring edges within the images.

Generally, medical imaging using gamma rays or X-rays are subject to health concerns about exposure to high levels of radiation, and, therefore, clinicians and engineers work to keep radiation levels as low as reasonably possible. Thus, methods are in demand that can maintain good image quality while lowering radiation dose rates by more effectively denoising reconstructed tomographic images. For example, conventional methods can be modified to better use common structures among three-dimensional images of a four-dimensional image to differentiate signals from noise in order to better remove the noise while maintaining sharp edges within the three-dimensional images.

Many medical imaging applications require multiple three-dimensional images of the same patient either at different times or at different X-ray energies to gain additional information not captured by a single three-dimensional image. For example, in spectral CT, sinogram data can be acquired for different energy spectra. Then, the spectral signatures of various material components can be used to decompose the spectrally-resolved sinograms into material-component sinograms. Perfusion CT provides a second example of a medical imaging application generating a series of three-dimensional images. In perfusion CT, CT images are acquired at different times to discern blood flow, volume, and transit time information. As a third example, in cardiac images, projection data from multiple scans can be used to improve temporal resolution and reduce noise. These multiple three-dimensional images are given the general label of four-dimensional images/data, wherein the fourth dimension is time, X-ray energy, or another categorization of the multiple three-dimensional images.

Generally there is a high degree of structural similarity among the three-dimensional constituent images of a four-dimensional image. For example, in a time series, the images can be acquired within a short time period, resulting in only small changes between time adjacent images. In contrast to the signals that remain largely unchanged between time-adjacent snapshots of a four-dimensional image, the noise will generally be statistically independent and uncorrelated between time-adjacent images.

Even though the three-dimensional images in a four-dimensional image can have strong similarities, even time-adjacent images can have different signal-to-noise ratios (SNRs) and different contrast-to-noise-ratios (CNRs) among the three-dimensional images. The structure information estimated from higher SNR/CNR three-dimensional images can benefit lower SNR/CNR three-dimensional images by using the structure information estimated from the higher SNR/CNR three-dimensional images to inform the denoising process of the lower SNR/CNR three-dimensional images in order to yield significant improvements to the image quality of the lower SNR/CNR three-dimensional images. Accordingly, the methods described herein use the structural redundancy present in four-dimensional images to improve denoising and reconstruction of the constituent three-dimensional images.

The methods described herein use joint edge-preserving (JEP) regularization to improve the denoising of four-dimensional CT data and reconstructed images. This method can be used for many CT applications that generate four-dimensional data and reconstructed images, including: spectral CT, perfusion CT, and cardiac CT. In contrast to independent edge preserving (IEP) regularization, the methods described herein have better resolution preservation, noise reduction, and improved image characters capture.

First, a general formulation of the JEP regularization is discussed. Then the general formulation of the JEP regularization is applied to the particular CT imaging applications. These particular CT imaging applications include: (i) denoising spectrally-resolved and/or material-decomposed reconstructed images using a penalized weighted least squares (PLWS) objective function that includes JEP regularization, (ii) denoising spectrally-resolved or material-decomposition sinograms using a PLWS objective function subject to JEP regularization and then reconstructing images from the denoised sinograms; (iii) reconstructing denoised images from spectrally-resolved sinogram data or material-decomposition sinogram data using a PLWS objective function subject to JEP regularization, and (iv) denoising a time-series of reconstructed images, which includes a difference image or an aggregate image, using a PLWS objective function subject to JEP regularization.

Now the general formulation of the JEP regularization is discussed. The image denoising problem can be formulated as minimizing a PWLS objective function, which is given by $$\min 1/2(y_n - \hat{y}_n)^T \Sigma_n^{-1}(y_n - \hat{y}_n) + \beta R(y_n),$$

wherein $\hat{y}_n$ is the $n^{th}$ representation of an input signal (image or sinogram), $\Sigma_n^{-1}$ is the inverse covariance matrix for multiple measurements of the $n^{th}$ representation, $\beta$ is a regularization parameter, and $R(y)$ is a regularization term. The inverse covariance matrix $\Sigma_n^{-1}$ represents noise and correlations between pixels of the $n^{th}$ representation. For IEP regularization the edge preserving regularizer can be given by $$R(y) = \sum_k \Psi_k(\hat{\Delta}_k, \delta) \Delta_k^2$$

wherein $\Psi_k$ is the edge preserving weighting function (i.e., potential function), $\Delta_k$ is the difference between nearby pixels of the denoised image y at the location denoted by index k, $\hat{\Delta}_k$ is the difference between nearby pixels of the input image $\hat{y}$ at a position denoted by index k, $\delta$ is the edge-preserving parameter, which is a predefined constant that determines the edge preservation. In some cases, more than one edge-preserving parameter can be used, such as in a q-generalized Gaussian Markov random field (MRF) model. Nearby pixels can include nearest neighbors, next-nearest neighbors, and next- next-nearest neighbors, for example. The term "pixel" can include two-dimensional pixels, e.g., in a projection image or a reconstructed image having only two spatial dimensions, or a three-dimensional volume pixel (voxel), e.g., in a reconstructed image having three spatial dimensions.

The general formula of SEP regularization for a four-dimensional image/sinogram having n representations is given by $$R(x_i) = \sum_{k=1}^n \Psi_k(\hat{\Delta}_{1,k}, \hat{\Delta}_{2,k}, \ldots, \hat{\Delta}_{n,k}, \delta_1, \delta_2 \ldots \delta_n) \Delta_{i,k}^2$$

wherein $\Delta_{1,k}, \Delta_{2,k}, \ldots, \Delta_{n,k}$ are the differences between nearby pixels for each respective representation of the denoised image/sinogram at the position denoted by index k, $\hat{\Delta}_{1,k}, \hat{\Delta}_{2,k}, \ldots, \hat{\Delta}_{n,k}$ are the differences between nearby pixels for each respective representation of the input image at the location denoted by index k, and $\delta_1, \delta_2 \ldots \delta_n$ are the respective edge-preserving parameters for the respective representations. For example, if edge preserving weighting function for the IEP regularizer is given by $$\Psi_k(\hat{\Delta}_k, \delta) = \exp(-\hat{\Delta}_k^2/\delta^2),$$

then the edge preserving weighting function for the JEP regularizer for the case of two representations is given by $$\Psi_k(\hat{\Delta}_{k,1}, \hat{\Delta}_{k,2}, \delta_1, \delta_2) = \exp(-\hat{\Delta}_{k,1}^2/\delta_1^2 - \hat{\Delta}_{k,2}^2/\delta_2^2),$$

Thus, in the JEP regularizer the edge preserving weighting function $\Psi_k(\hat{\Delta}_{1,k}, \hat{\Delta}_{2,k}, \ldots, \hat{\Delta}_{n,k}, \delta_1, \delta_2, \ldots \delta_n)$ draws from the information of all of the representations 1, 2, . . . , n in order to determine the penalty for image roughness at a given pixel in a respective representation.

For uncorrelated three-dimensional sinograms and/or three-dimensional reconstructed images, the penalized weighted least square with joint-edge regularization (PWLS-JEP) denoising method can be applied to improve noise suppression without sacrificing edge preservation. A three-dimensional sinogram has two dimensions corresponding to the spatial dimensions of the respective projection images and a third dimension corresponding to the projection angle of the CT scan. For brevity, the term "representation" is used to refer to both three-dimensional sinograms and three-dimensional reconstructed images. Additionally, the term "representation" is used generally to refer to both time resolved and energy resolved sinograms and images. Accordingly, the term "representation" used herein alternately can refer to snapshots in a time series and can also refer to energy bins or material components for spectral CT. A "representation" can be any three-dimensional sinogram or three-dimensional spatial image of a four-dimensional image, whether the fourth dimension is time, X-ray energy, or some other variable.

Often, the term "projection data" is used to refer to X-ray data obtained by projection through an object or patient being imaged. However, because data is generally used as a mass noun which is not pluralized, it is often difficult to distinguish, based on context alone, between projection data referring to an entire four-dimensional image and projection data referring to a single three-dimensional image within a four-dimensional image. Accordingly, where confusion arises from the use of the term "projection data," a different term "projection dataset" will be used instead. Accordingly, a "projection dataset" (singular) refers to the projection data corresponding to only one three-dimensional image, whereas "projection datasets" (plural) refers to projection data for more than one three-dimensional image. Thus, the data from a single CT scan can be referred to as a "projection dataset," and the data from a series of CT scans measured at different times can be referred to as "projection datasets." Similarly, data corresponding to a single energy bin of a single spectral CT scan can be referred to as a "projection dataset," whereas data corresponding to multiple energy bins of the same single spectral CT scan can be referred to as "projection datasets." The term "projection datasets" can be used for projection data corresponding to multiple energy bins whether the data for respective energy bins was acquired simultaneously (e.g., using a broadband X-ray source and photon counting detectors) or at staggered time intervals (e.g., using a kV-switching and energy-integrating detectors).

In certain implementations, a whitening transform can advantageously be used to transform representations from an original basis into an uncorrelated basis, and then the denoising method with a JEP regularizer can be applied in the uncorrelated basis. The whitening transform does not necessarily reduce the structural similarity among the representations, but the whitening transform reduces and eliminates the off-diagonal terms in the covariance matrix between the representations in the uncorrelated basis, as discussed in U.S. patent application Ser. No. 14/997,365, incorporated herein by reference in its entirety.

The covariance matrix of the representations is determined by calculating the zero-mean covariance between the representations of the four-dimensional images/sinograms, such that when there are n representations, the covariance matrix would have dimensions of n×n. For example, consider the case of material decomposition into two material components: a bone component (n=1) and a water component (n=2). For each material component, the sinogram of the projection data can be represented by $\hat{y}_n[p,q,r] = \hat{y}_n[k]$, wherein $p \in (0, 1, \ldots, P-1)$, $q \in [0, 1, \ldots, Q-1]$, and $r \in [0, 1, \ldots, R-1]$ are three spatial indices of the reconstructed image, $k = p + q \times P + r \times PQ$ is a single index to represent the three indices p, q, and r, $k \in \{0, 1, \ldots, K-1\}$, and $K = P \times Q \times R$. The sinogram representations can be related to the reconstructed image representations by a system matrix equation, which is given by $$A_n \hat{x}_n = \hat{y}_n,$$

wherein $A_n$ is a system matrix of the $n^{th}$ representation of the four-dimensional image, and $\hat{x}_n$ is a reconstructed image of the $n^{th}$ representation. The covariance matrix corresponding to the bone and water components is given by $$\sum_{\hat{y}} = \sum_{nm} = \begin{bmatrix} s_{11} & s_{12} \\ s_{21} & s_{22} \end{bmatrix},$$

wherein the matrix elements are calculated using the expectation values of the mean subtracted products, which can be calculated as $$s_{nm} = \sum_{k=0}^{P \times Q \times R} (\hat{y}_n[k] - \mu_n)(\hat{y}_m[k] - \mu_m),$$

and the mean is given by $$\mu_n = \frac{1}{K} \sum_{k=0}^{K-1} \hat{y}_n[k].$$

Alternatively, a covariance matrix $\Sigma_\lambda$ can be calculated between respective spectral-sinogram components corresponding to each energy bin of a photon-counting detector. In this case, a transformation can be performed on the energy-bin covariance matrix $\Sigma_\lambda$ to generate the material-component covariance matrix $\Sigma_{\hat{y}}$. The transformation from the energy-bin covariance matrix $\Sigma_\lambda$ to the material-component covariance matrix $\Sigma_{\hat{y}}$ can be given by $$\Sigma_{\hat{y}} = K \Sigma_\lambda K^T$$

wherein the elements of the matrix K are given by $$K_{i,j} = \int_E q_i(E) f_j(E) dE,$$

$f_j(E)$ denotes the energy dependent material attenuation coefficients, $$q_i(E) = \frac{S(E)D(E)}{\int_E S(E)D(E)dE}$$

is the system weighting function which can be calculated from the energy spectra S(E) and detector response D(E).

To perform a whitening transform, a whitening matrix is used. The whitening matrix is determined by performing an eigenvalue decomposition of the covariance matrix. The covariance matrix $\Sigma_{\hat{y}}$ is decomposed into its eigenvalues (represented by the diagonal matrix $\Lambda$) and eigenvectors (represented by the columns of matrix $\Phi$). Using the covariance matrix $\Sigma_{\hat{y}}$ the eigenvalues and eigenvectors can be obtained by solving the equation $$\Sigma_{\hat{y}} \Phi = \Phi \Lambda$$

wherein the matrix $\Phi$ is a transform matrix to diagonalize the covariance matrix $\Sigma_{\hat{y}}$, the columns of the matrix $\Phi$ are the eigenvectors of the covariance matrix, and $\Lambda$ is a diagonal matrix having the eigenvalues as its diagonal elements.

The whitening transform can be calculated as $$W = \Lambda^{-1/2} \Phi^T,$$

and the material-component sinograms $\hat{y}_n[k]$ can be transformed to uncorrelated-basis sinograms $\hat{U}_n^{(y)}[k]$ according to $$\begin{bmatrix} \hat{U}_1^{(y)}[k] \\ \hat{U}_2^{(y)}[k] \end{bmatrix} = \begin{bmatrix} W_{11} & W_{12} \\ W_{21} & W_{22} \end{bmatrix} \begin{bmatrix} \hat{y}_1[k] \\ \hat{y}_2[k] \end{bmatrix}.$$

In the example shown above, the sinogram representations $\hat{y}_n[k]$ were transformed into an uncorrelated basis. A similar process can be used for the reconstructed-image representations $\hat{x}_n[k]$, which are related to the reconstructed images by the system matrix equation $$A_n \hat{x}_n = \hat{y}_n.$$

If the data from multiple representations (i.e., image or sinogram) are highly correlated, a whitening transform can be used to de-correlate the representations. Then, the PWLS-JEP denoising method is applied in the uncorrelated basis to suppress noise; after which, an inverse whitening transform can be applied to obtain the denoised representations in the original basis.

Referring now to the drawings, wherein like reference numerals designate identical or corresponding parts throughout the several views, FIG. 1 shows source and detector portions of a computed tomography (CT) scanner having both energy-integrating detectors arranged in a third-generation geometry and photon-counting detectors arranged in a fourth-generation geometry. Illustrated in FIG. 1 is an implementation for placing the photon-counting detectors (PCDs) in a predetermined fourth-generation geometry in combination with a detector unit 103 in a predetermined third-generation geometry in a CT scanner system. The diagram illustrates relative positions among an object OBJ to be scanned resting on a table 116, an X-ray source 112, a collimator/filter 114, an X-ray detector 103, and photon-counting detectors PCD1 through PCDN.

In one implementation, the X-ray source 112, the collimator/filter 114 are fixedly connected to a rotational component 110 that is rotatably connected to a gantry, and the PCDs are fixedly connected to a circular component 120 that is fixedly connected to the gantry. The gantry of the CT scanner also includes an open aperture 115 enabling the object OBJ to be placed in a projection plane of the X-rays from the X-ray source. The X-ray detector 103 is fixedly connected to a rotational component 130 that is rotatably connected to the gantry. The rotational component 120 and the rotational component 130 can rotate in unison maintaining the X-ray detector 103 diametrical opposed to the X-ray source 112 to obtain projection data of the object OBJ at a progression of projection angles. Sinograms, such as the sinogram shown in FIG. 1A, are created by arranging the projection data with projection angles arranged along one axis and the spatial dimensions of the projection data arranged along the other axes.

In spectral CT, radiation having multiple energy components is used to make projective measurements of the object OBJ. These projective measurements are made at a series of angles enabling conventional CT image reconstruction methods similar to non-spectral CT. However, unlike non-spectral CT, spectral CT generates additional information (i.e., spectral attenuation information) enabling a decomposition of the projective measurements into material components, usually two material components. The material decomposition results in two component materials because there are two dominant interaction mechanisms causing the attenuation of the X-ray beams traversing the imaged object OBJ. These interaction mechanisms are Compton scattering and photoelectric absorption. Mapping the projection data from the spectral domain to the material domain can be performed either before or after the image reconstruction process.

The attenuation of X-rays in biological materials is dominated by two physical processes (i.e., photoelectric absorption and Compton scattering). Thus, the attenuation coefficient as a function of energy can be approximated by the decomposition $$\mu(E, x, y) = \mu_{PE}(E, x, y) + \mu_C(E, x, y),$$

wherein $\mu_{PE}(E, x, y)$ is the photoelectric attenuation and $\mu_C(E, x, y)$ is the Compton attenuation. Alternatively, this attenuation coefficient can be rearranged into a decomposition of a high-Z material (i.e., material 1) and a low-Z material (i.e., material 2) to become $$\mu(E, x, y) \approx \mu_1(E) c_1(x, y) + \mu_2(E) c_2(x, y),$$

wherein $c_1(x, y)$ and $c_2(x, y)$ are, respectively correspond to a first and second material component.

The detected spectrum is given by $$S(E_i) = S_{air}(E_i) \exp[-\mu_1(E_i) L_1 - \mu_2(E_i) L_2],$$

wherein the attenuation coefficients $\mu_1$ and $\mu_2$ are known functions of the X-ray energy, and the spectrum $S_{air}$, corresponding to the X-rays propagating through air in the absence of an absorptive object OBJ, is also known based on previous calibrations, for example. This detected spectrum can be coarse grained into X-ray energy bins (e.g., five energy bins can be used, each covering a respective energy sub-band, such that combined the energy bins span an energy spectrum from approximately 20 keV to approximately 160 keV). The count value $N_m$ of the $m^{th}$ energy bin can be given by $$N_m = \int dE w_m(E) S(E),$$

wherein $w_m(E)$ is a windowing function corresponding to the energy sub-band of the $m^{th}$ energy bin.

When at least two energy bins are detected for each pixel, the projection lengths $L_1(X_i)$ and $L_2(X_i)$ for each pixel of a projection image, can be estimated using the above expressions for the detected energy spectrum and the number of counts in each energy bin. The transformation from energy resolved X-ray counts to projection lengths corresponding to the first and second material components is referred to as a material decomposition. The material-decomposition sinograms can be the respective projection lengths arranged as three-dimensional data having two dimensions corresponding to the indices of the respective detector elements within a two-dimensional detector array and a third dimension corresponding to the projection angle.

Figure 2:
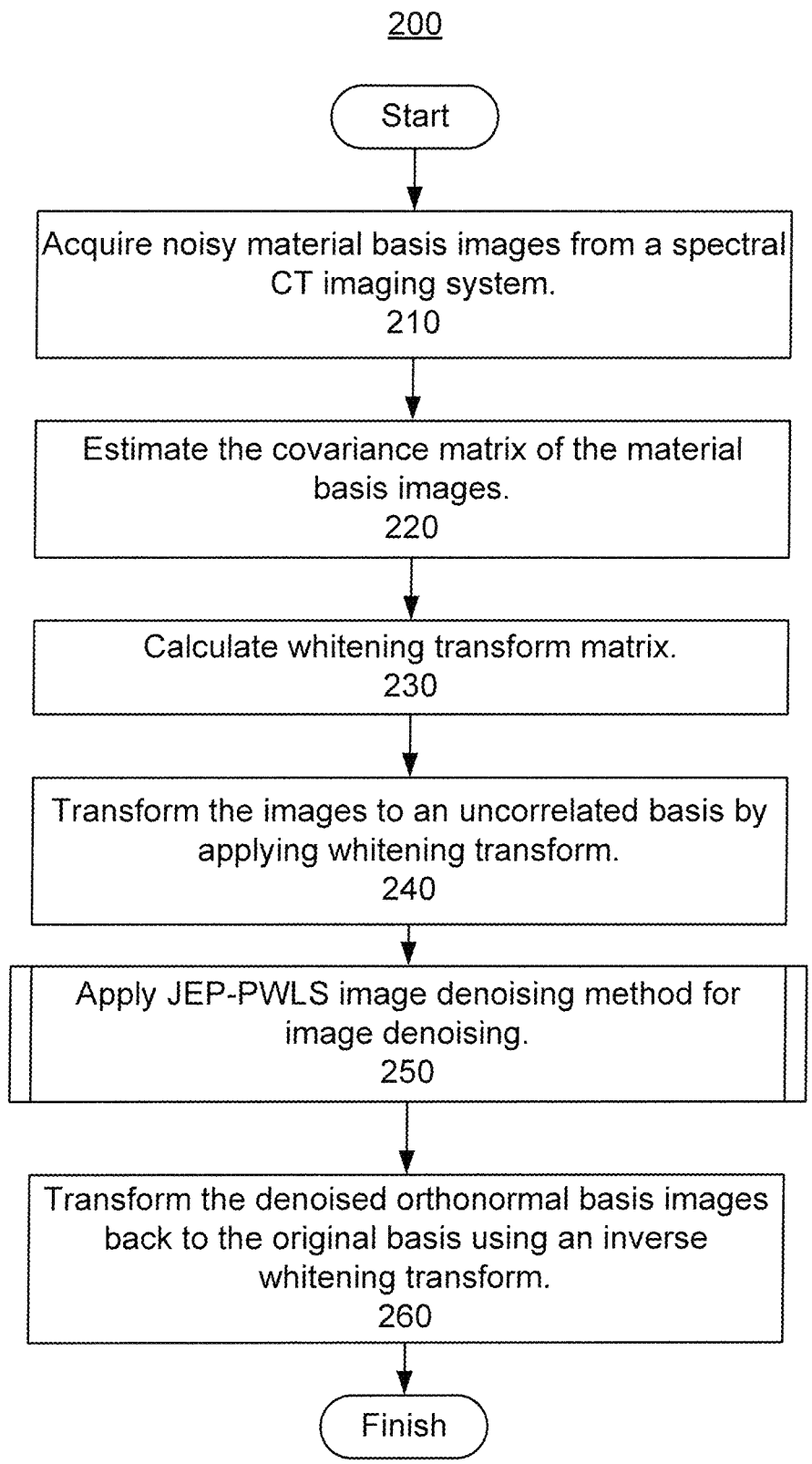
FIG. 2 shows a flow diagram of a method of denoising a series of images using an objective function having joint-edge-preserving term, according to one implementation.

FIG. 2 shows a flow diagram of a method 200 for denoising reconstructed images.

In step 210 of method 200, reconstructed images $\hat{x}_n$ are generated from projection data. The measurement process to generate the projection data (i.e., projections scans) can be inherently noise, resulting in the generation of noisy images $\hat{x}_n$. The noisy images $\hat{x}_n$ can correspond, for example, to material components, spectral components, or mono-energetic images obtained in spectral CT. The reconstructed images can be generated using filtered back-projection methods, statistical iterative reconstruction methods, or any known tomographic image reconstruction method.

In step 220 of method 200, the covariance matric $\Sigma_{\hat{x}}$ between the noisy images is determined in a manner similar to the covariance matrix $\Sigma_{\hat{y}}$ of the sinograms discussed above. Further, the eigenvalue decomposition of the covariance matrix $\Sigma_{\hat{x}}$ yields $$\Sigma_{\hat{x}} \Phi_{\hat{x}} = \Phi_{\hat{x}} \Lambda_{\hat{x}},$$

wherein $\Phi_{\hat{x}}$ is the matrix of eigenvalues and $\Lambda_{\hat{x}}$ is a diagonal matrix of eigenvalues for the covariance matrix $\Sigma_{\hat{x}}$.

In step 230 of method 200, a whitening transform $W_{\hat{x}}$ is determined. The whitening transform is given by $$W_{\hat{x}} = \Lambda_{\hat{x}}^{-1/2} \Phi_{\hat{x}}^T.$$

In step 240 of method 200, the whitening transform is used to transform the images into uncorrelated-basis images $\hat{U}_1^{(x)}$ and $\hat{U}_2^{(x)}$.

In process 250 of method 200, the denoised images are obtained by solving the PWLS objective function $$\underset{U_n^{(x)}}{\mathrm{argmin}} \left( \left( U_n^{(x)} - \hat{U}_n^{(x)} \right)^T \sum_n^{-1} \left( U_n^{(x)} - \hat{U}_n^{(x)} \right) \right) + \beta R_n(U_n^{(x)}),$$

wherein $\Sigma_n^{-1}$ is the inverse of a covariance matrix among the pixels of reconstructed images corresponding to the $n^{th}$ representation, $\Sigma_n^{-1}$ is expressed in the uncorrelated basis, $U_n^{(x)}$ is the $n^{th}$ denoised image in the uncorrelated basis, and $R_n(U_n^{(x)})$ is the regularizer. In certain implementations, the regularizer $R_n(U_n^{(x)})$ can be given by $$R_n(U_n^{(x)}[k]) = \Delta_n^2[k] \prod_{m=1}^{2} \exp\left(-\frac{\hat{\Delta}_m^2[k]}{\delta_m^2}\right),$$

wherein $\hat{\Delta}_m[k]$ is a difference between nearby pixels of index k in the $m^{th}$ noisy image $\hat{U}_m^{(x)}$, $\delta_m$ is the edge-preserving parameter of the $m^{th}$ noisy image $\hat{U}_m^{(x)}$, and $\Delta_n[k]$ is a difference between nearby pixels of index k in the $m^{th}$ denoised image $U_m^{(x)}$. The edge-preserving parameters $\delta_m$ can depend on the CNR of the corresponding noisy image $\hat{U}_m^{(x)}$ and on the relative weighting between the noisy images. Any known method can be used to find the argument that minimizes the PWLS objective function. For example, a separable paraboloidal surrogate (SPS) algorithm can be used.

In step 260 of method 200, the denoised images in the correlated basis are transformed back into the original basis using $$x = W_{\tilde{x}}^{-1} U^{(x)}.$$

Figure 3A:
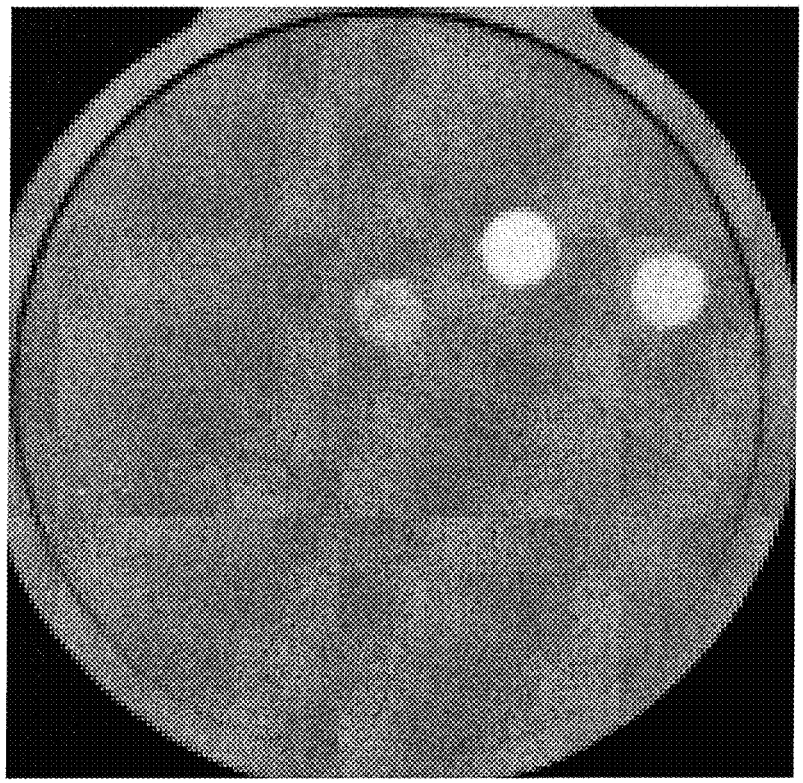
FIG. 3A shows an example of a noisy reconstructed image in a first component of an uncorrelated basis.
Figure 3B:
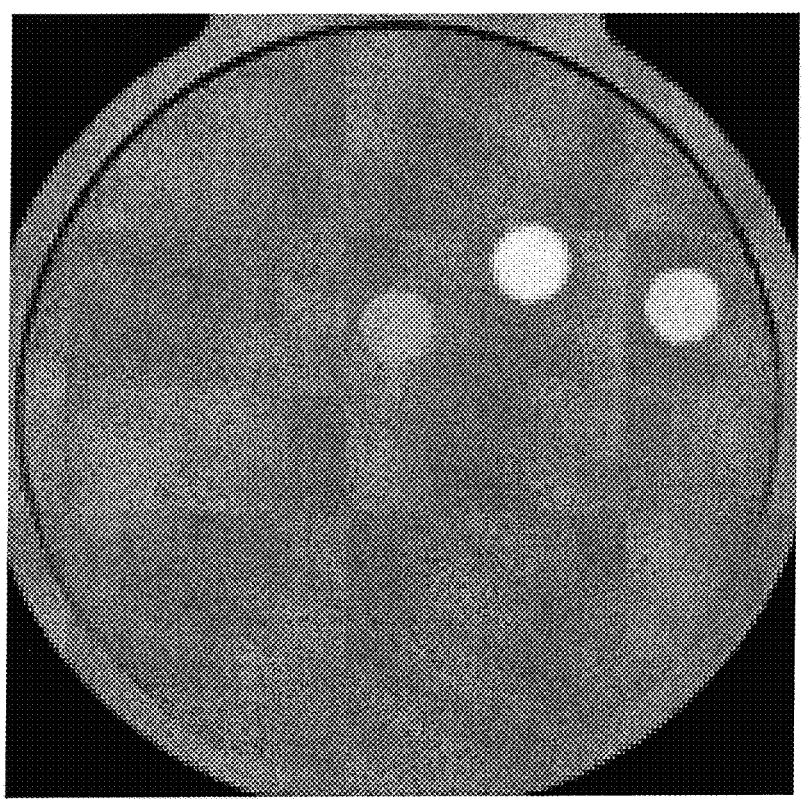
FIG. 3B shows an example of a denoised reconstructed image in the first component of the uncorrelated basis.
Figure 3C:
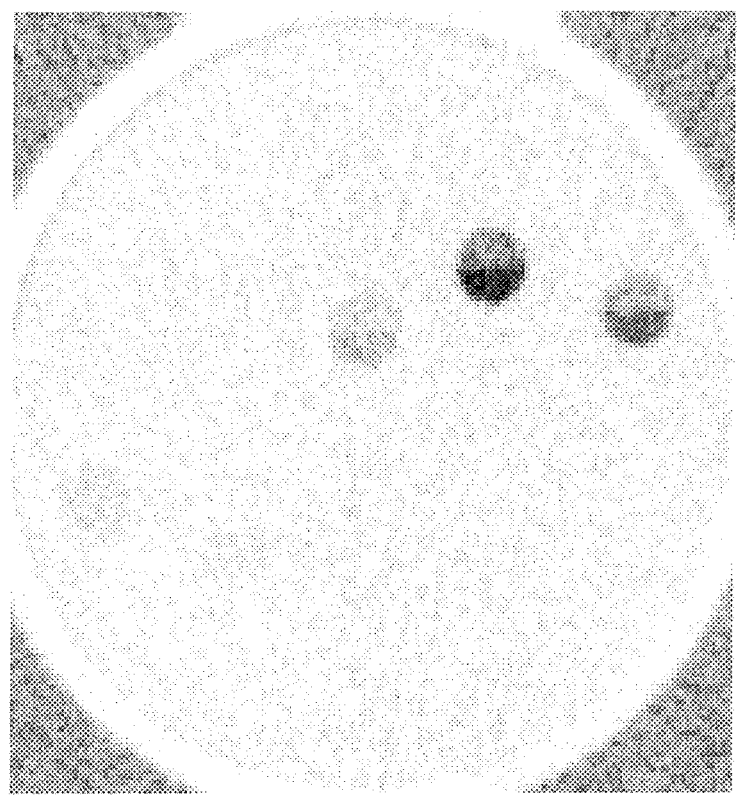
FIG. 3C shows an example of a noisy reconstructed image in a second component of the uncorrelated basis.
Figure 3D:
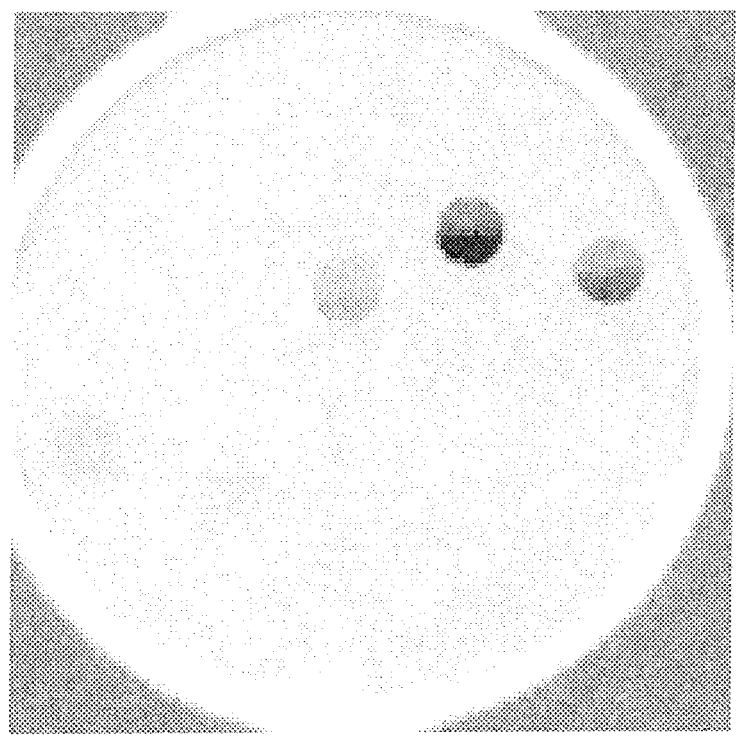
FIG. 3D shows an example of a denoised reconstructed image in the second component of the uncorrelated basis.

FIGS. 3A and 3C show noisy images in the uncorrelated basis. FIGS. 3B and 3D show denoised images in the uncorrelated basis. In FIGS. 3B and 3D the denoised images were obtained using the JEP regularizer. FIGS. 3B and 3D respectively correspond to FIGS. 3A and 3C. As can be seen, the JEP regularizer does well at denoising the images while preserving edges within the denoised images. In this example, an SPS algorithm was used to solve for the minimum of the objective function.

Figure 4A:
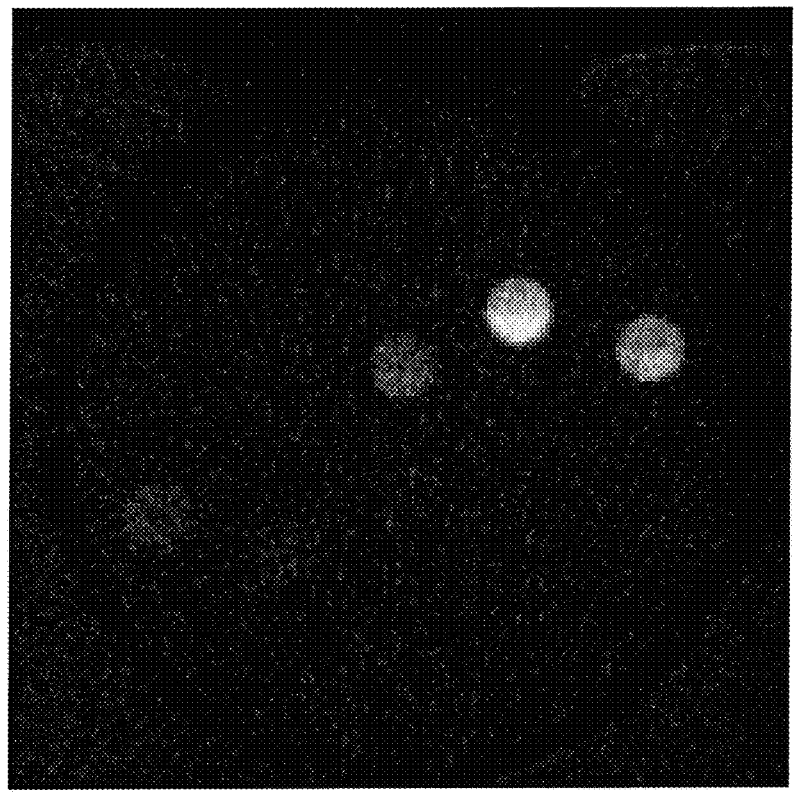
FIG. 4A shows an example of a noisy reconstructed image in a first component (bone) of a material-component basis.
Figure 4B:
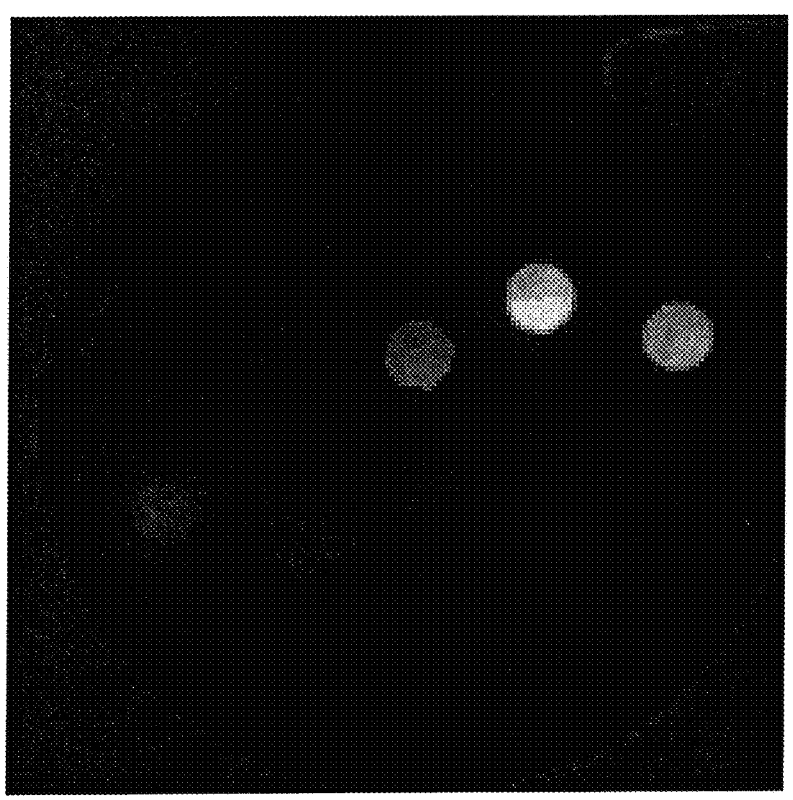
FIG. 4B shows an example of a denoised reconstructed image in the first component (bone) of the material-component basis.
Figure 4C:
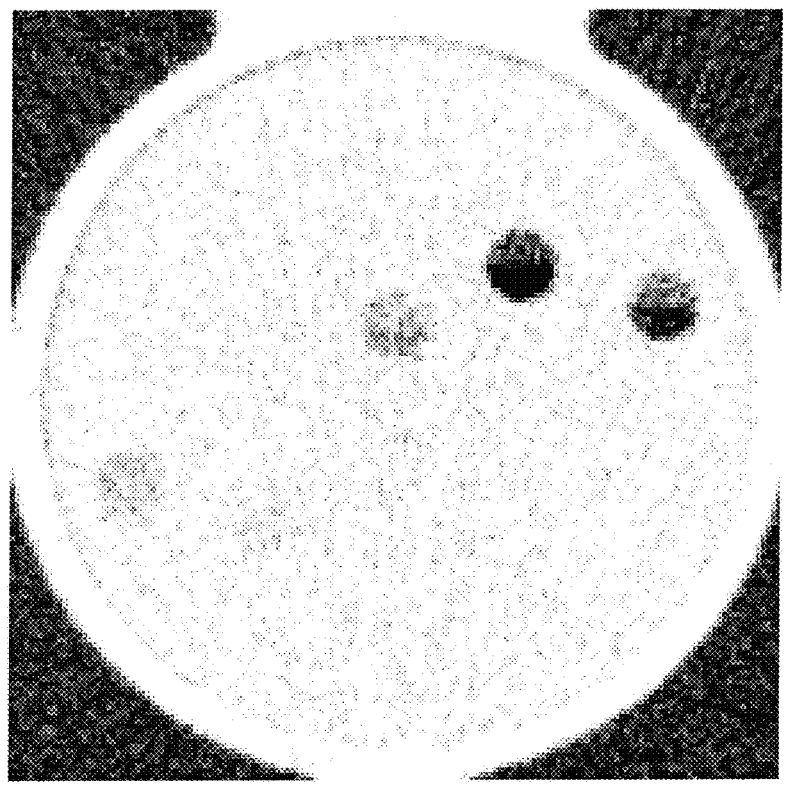
FIG. 4C shows an example of a noisy reconstructed image in a second component (water) of the material-component basis.
Figure 4D:
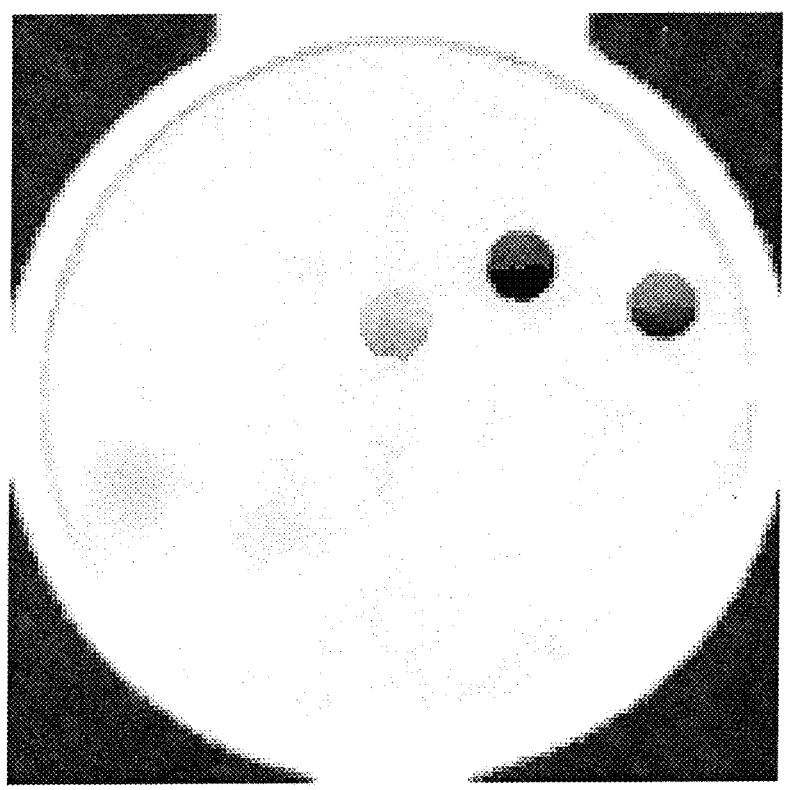
FIG. 4D shows an example of a denoised reconstructed image in the second component (water) of the material-component basis.

FIGS. 4A and 4C show noisy images in the material-component basis. FIG. 4A corresponds to a bone-material component. FIG. 4C corresponds to a water-material component. FIGS. 4B and 4D show the denoised images in the material-component basis. FIG. 4B corresponds to a bone-material component. FIG. 4D corresponds to a water-material component.

Although method 200 is exemplified using only two representations corresponding to two material components, method 200 can also be used with more than two representations. For example, a CT scanner could be configured to perform spectrally-resolving X-ray measurements that resolve the detected X-rays into five energy bins corresponding to five different energy bands of the X-ray spectrum, for example. In this case, five representations, corresponding to the respective energy bands, could be used in method 200. Alternatively, the five energy bins can be decomposed into two material components, and the denoising method can be performed for the two material components.

In certain implementations, the calculation of the covariance matrix together with the whitening transformation and inverse transformation in steps 220, 230, and 250 can be omitted. In this case, the denoising can be performed in the original basis without transforming into the uncorrelated basis.

In certain implementations, the edge-preserving parameter $\delta_1$ and $\delta_2$ can depend on the contrast-to-noise ratio (CNR) of the respective images. For example, for images exhibiting larger CNRs, the edge-preserving parameter value can be smaller in order to better preserve the edge information. On the other hand, if an image exhibits a smaller CNR, the edge-preserving parameter value can be larger to better suppress noise.

In certain implementations, the relative magnitude of the respective CNRs of the images can be used to determine the relative values of the edge-preserving parameters $\delta_1$ and $\delta_2$. For example, if the CNR of the first image is greater than the CNR of the second image, then $\delta_1$ can be chosen to be smaller than $\delta_2$ in order to give more weight to the first image in the regularizer, and vice versa.

FIG. 5 shows a flow diagram of method 500 of denoising noisy sinogram data, and then reconstructing denoised images from the denoised sinogram data. Method 500 is applied to the example of spectral CT, but method 500 can also be applied to other four-dimensional images/sinograms.

In step 510 of method 500, sinogram data is generated, and the sinogram data is noisy due to noise inherent to the measurement process. The noisy sinogram data $\hat{y}_n$ can correspond, for example, to material components, spectral components, or mono-energetic sinograms.

In step 520 of method 500, the covariance matrix $\Sigma_{\hat{y}}$ of the noisy images is determined, similar to step 220 of method 200.

In step 530 of method 500, a whitening transform $W_{\hat{y}}$ is determined, which is given by $$W_{\hat{y}} = \Lambda_{\hat{y}}^{-1/2} \Phi_{\hat{y}}^T.$$

In step 540 of method 500, the whitening transform is used to transform the sinograms into the uncorrelated basis $\hat{U}_1^{(y)}$ and $\hat{U}_2^{(y)}$.

In process 550 of method 500, the denoised sinograms are obtained by solving the PWLS objective function $$\operatorname*{argmin}_{U_n^{(y)}} \left( \left( U_n^{(y)} - \hat{U}_n^{(y)} \right)^T \sum_n^{-1} \left( U_n^{(y)} - \hat{U}_n^{(y)} \right) \right) + \beta R_n(U_n^{(y)}),$$

wherein $\Sigma_n^{-1}$ is the inverse covariance matrix among the pixels of the sinogram of the $n^{th}$ representation, $\Sigma_n^{-1}$ is expressed in the uncorrelated basis, $U_n^{(y)}$ is the $n^{th}$ denoised sinogram in the uncorrelated basis, and $R_n (U_n^{(y)})$ is the regularizer. In certain implementations, the regularizer $R_n (U_n^{(y)})$ can be given by $$R_n(U_n^{(y)}[k]) = \Delta_n^2[k] \prod_{m=1}^{2} \exp\left( -\frac{\hat{\Delta}_m^2[k]}{\delta_m^2} \right),$$

wherein $\hat{\Delta}_m [k]$ is a difference between nearby pixels of index k for the $m^{th}$ noisy sinogram $\hat{U}_m^{(y)}$, $\delta_m$ is the edge-preserving parameter of the $m^{th}$ noisy sinogram $\hat{U}_m^{(y)}$, and $\Delta_n[k]$ is a difference between nearby pixels of index k for the $m^{th}$ denoised sinogram $U_m^{(y)}$. The edge-preserving parameters $\delta_m$ can depend on the contrast-to-noise ratio of the corresponding noisy sinogram $\hat{U}_m^{(y)}$ and on the relative weighting between the noisy sinogram, similar to the edge-preserving parameters $\delta_m$ discussed for method 200. Any known method can be used to find the argument that minimizes the PWLS objective function. For example, an SPS algorithm can be used.

In step 560 of method 500, the denoised sinograms in the correlated basis are transformed back into the original basis, which is given by $$y = W_{\hat{y}}^{-1} U^{(y)}.$$

In step 570 of method 500, denoised images can be reconstructed from the denoised sinograms using any known reconstruction method. For example, the denoised images can be reconstructed using the Feldkamp-Davis-Kress (FDK) algorithm or using an iterative reconstruction algorithm such as the alternating direction method of multiplier (ADMM) method.

Figure 6A:
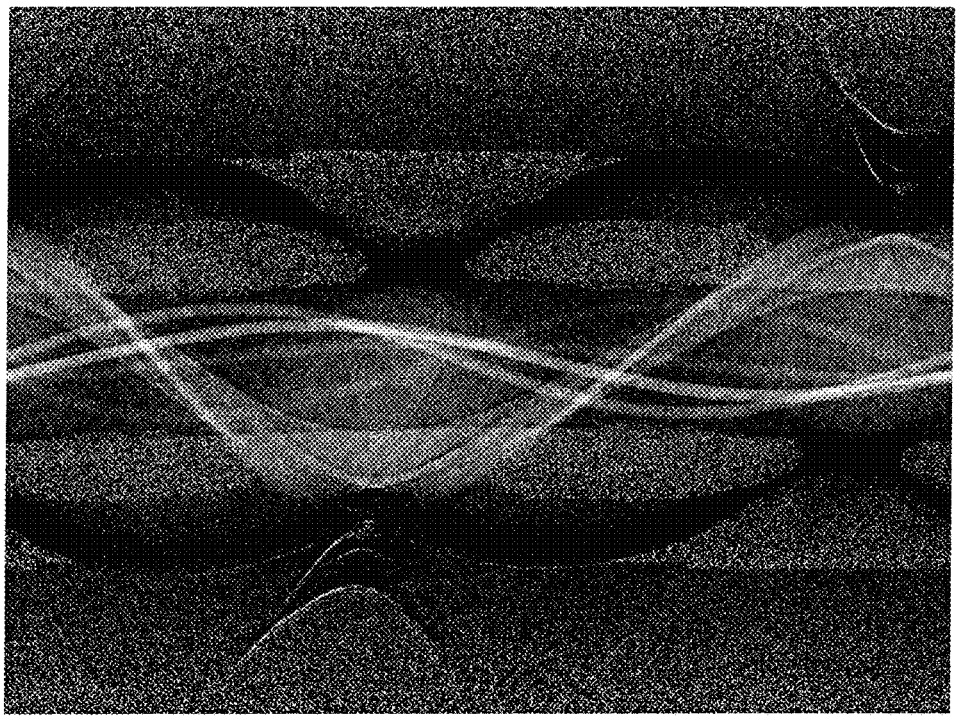
FIG. 6A shows an example of a noisy sinogram in the first component (bone) of the material-component basis.
Figure 6B:
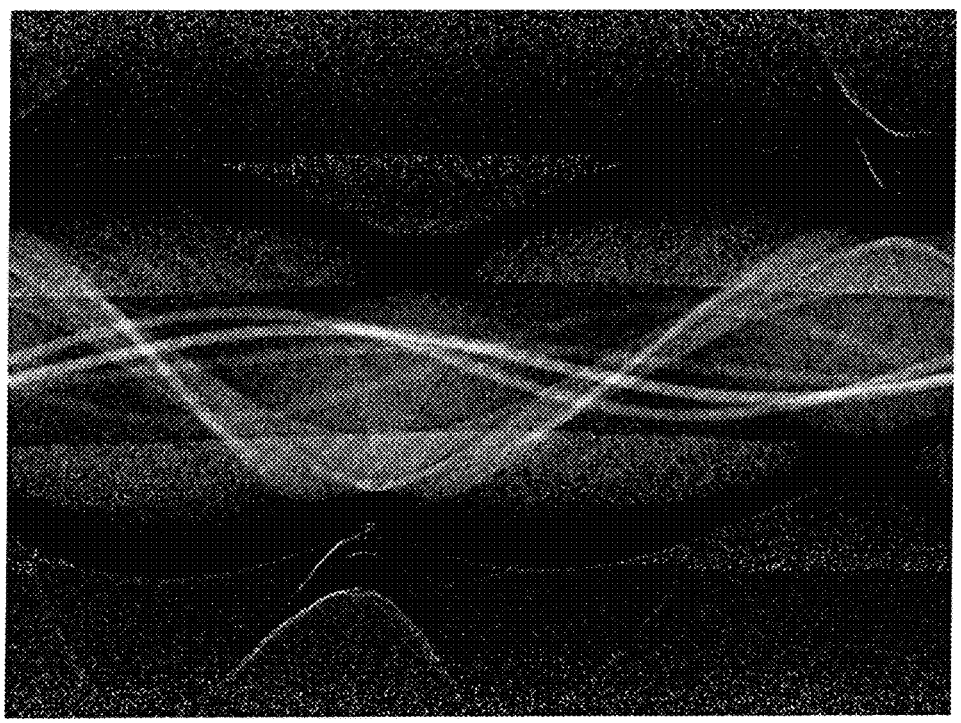
FIG. 6B shows an example of a denoised sinogram in the first component (bone) of the material-component basis.
Figure 6C:
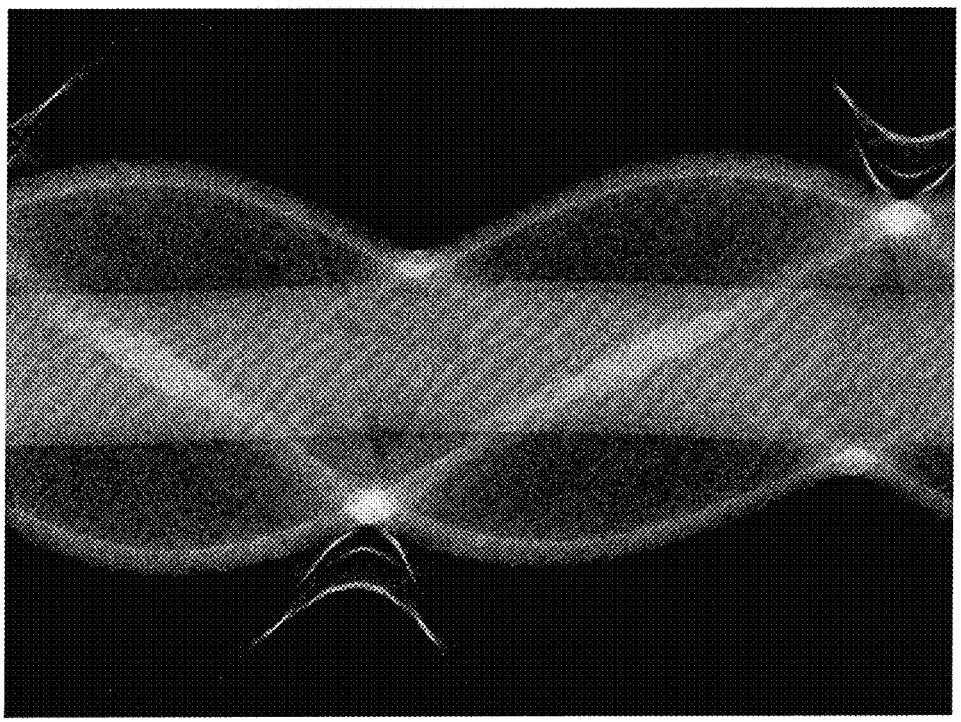
FIG. 6C shows an example of a noisy sinogram in the second component (water) of the material-component basis.
Figure 6D:
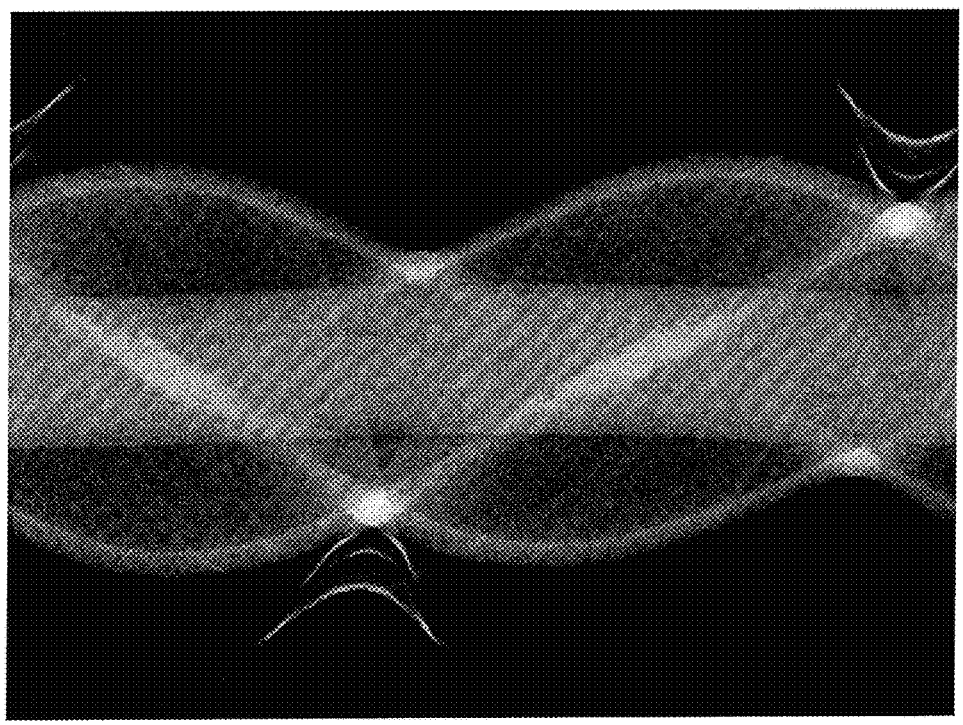
FIG. 6D shows an example of a denoised sinogram in the second component (water) of the material-component basis.

FIGS. 6A and 6C show noisy sinograms in the material-component basis. FIGS. 6B and 6D respectively show denoised sinograms in the material-component basis. The denoised sinograms shown in FIGS. 6B and 6D were obtained using the JEP regularizes, and FIGS. 6B and 6D correspond respectively to the sinograms shown in FIGS. 6A and 6C. In this example, an SPS algorithm was used to minimize the objective function.

Figure 7A:
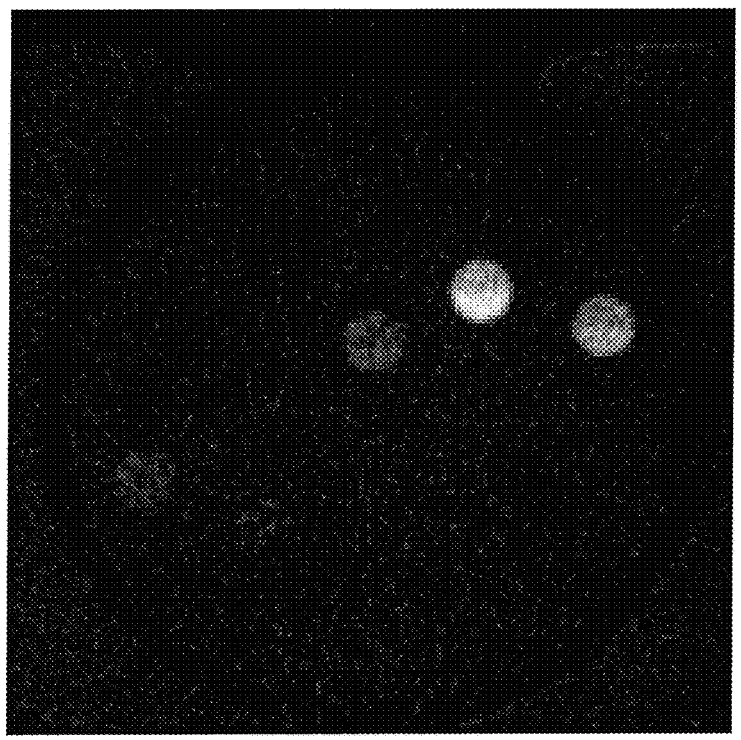
FIG. 7A shows an example of a noisy reconstructed image in a first component (bone) of a material-component basis, which has been reconstructed from the sinogram shown in FIG. 6A.
Figure 7B:
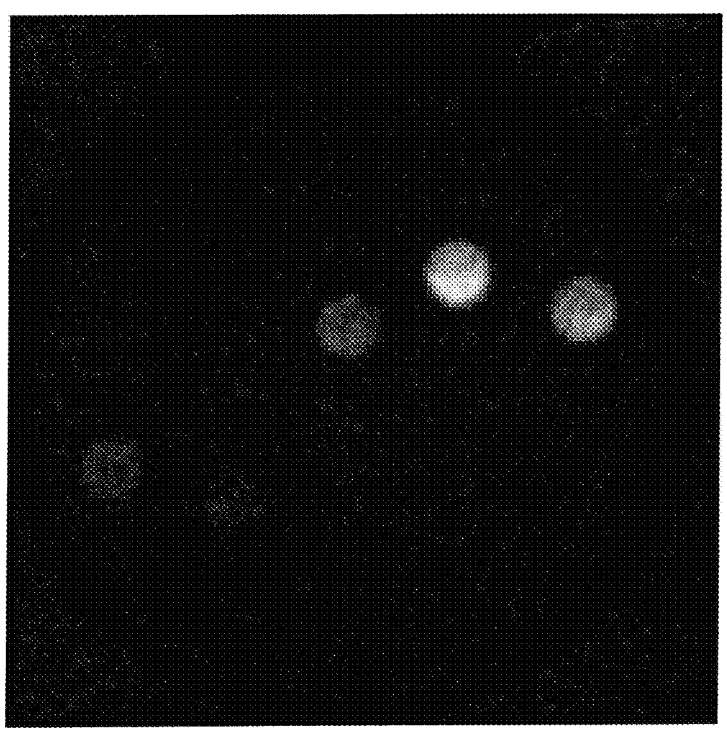
FIG. 7B shows an example of a denoised reconstructed image in the first component (bone) of the material-component basis, which has been reconstructed from the sinogram shown in FIG. 6B.
Figure 7C:
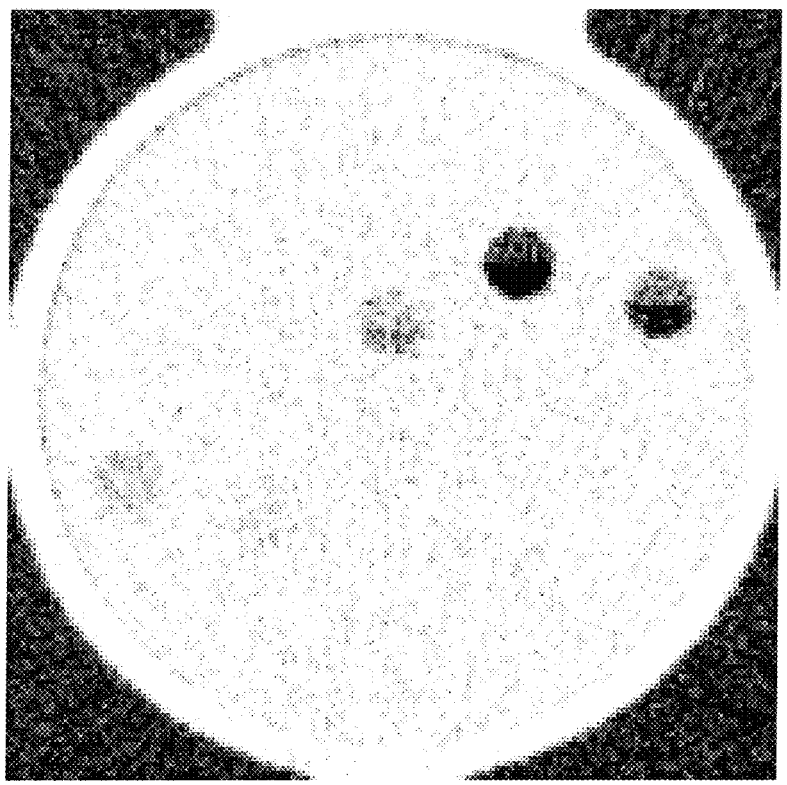
FIG. 7C shows an example of a noisy reconstructed image in a second component (water) of the material-component basis, which has been reconstructed from the sinogram shown in FIG. 6C.
Figure 7D:
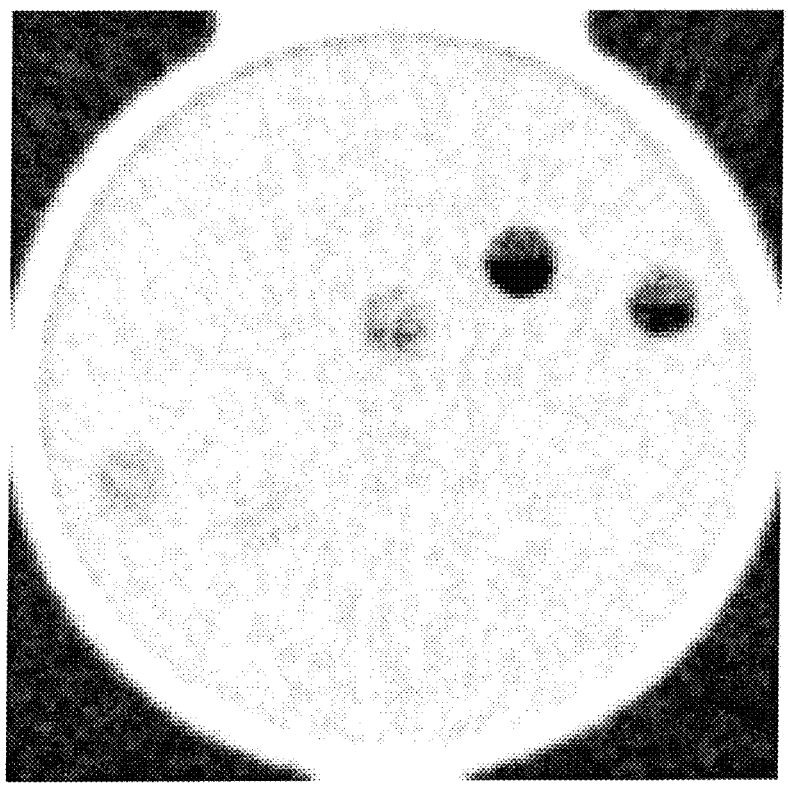
FIG. 7D shows an example of a denoised reconstructed image in the second component (water) of the material-component basis, which has been reconstructed from the sinogram shown in FIG. 6D.

FIGS. 7A and 7C show noisy images in the material-component basis, which were reconstructed from the sinograms shown in FIGS. 6A and 6C, respectively. Similarly, FIGS. 7B and 7D show denoised images in the material-component basis, which were reconstructed from the sinograms shown in FIGS. 6B and 6D, respectively. FIGS. 6A, 6C, 7A, and 7C correspond to a bone-material component, while FIGS. 6B, 6D, 7B, and 7D correspond to a water-material component.

Figure 8:
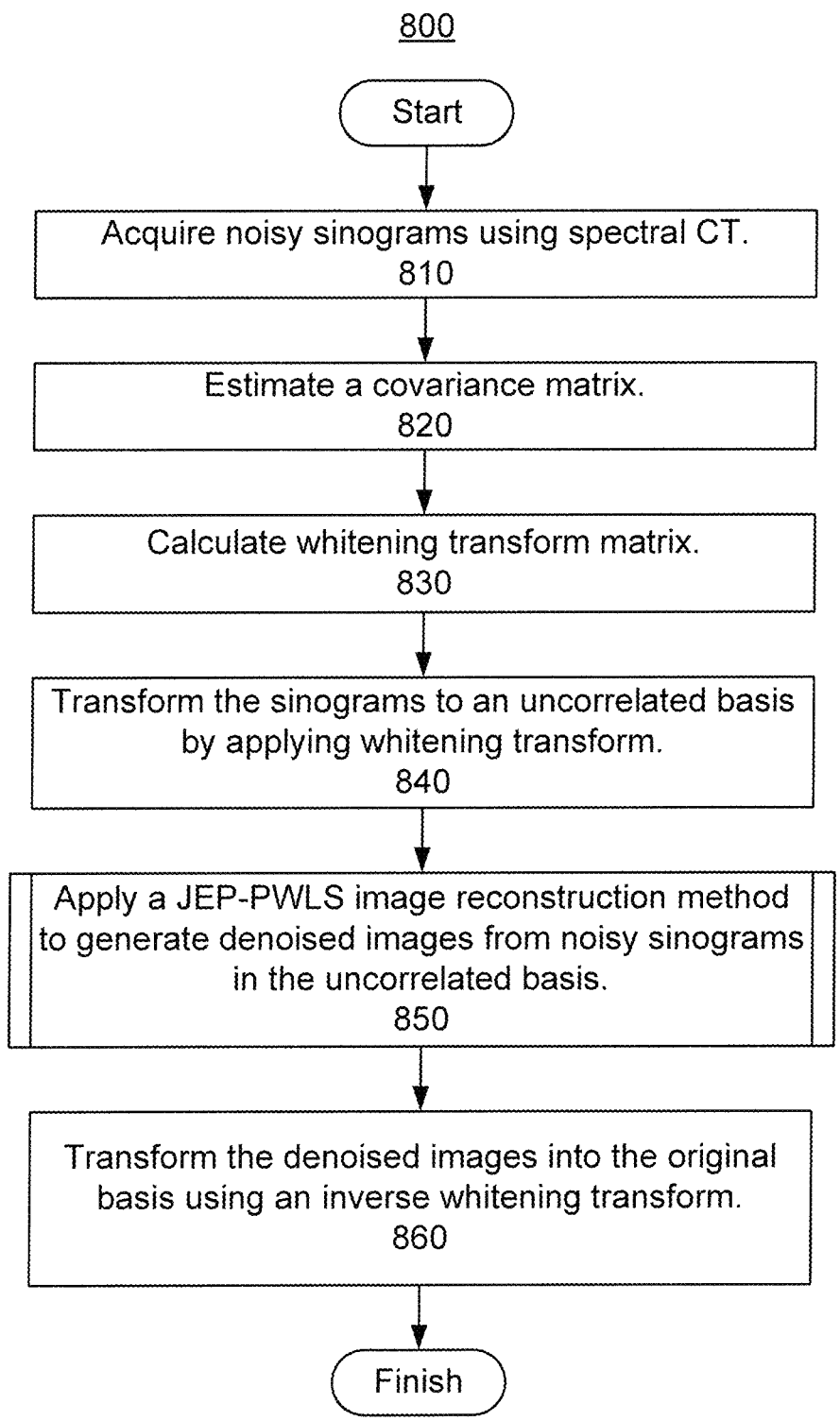
FIG. 8 shows a flow diagram of a method of reconstructing a series of denoised images from a series of noisy sinograms using an objective function having joint-edge-preserving term, according to one implementation.

FIG. 8 shows a flow diagram of method 800 of generating denoising reconstructed images from noisy sinogram data. Method 800 is applied to the example of spectral CT.

In step 810 of method 800, sinogram data is generated, and the sinogram data is noisy due to noise inherent to the measurement process. The noisy sinogram data $\hat{y}_n$ can correspond, for example, to material components, spectral components, or mono-energetic sinograms.

In step 820 of method 800, either the covariance matrix $\Sigma_{\hat{x}}$ of the noisy images or the covariance matrix $\Sigma_{\hat{y}}$ of the noisy sinograms is determined, depending on whether the whitening transform is based on the images or the sinograms.

In step 830 of method 800, a whitening transform W is determined. In certain implementations, the whitening transform can be determined using the sinograms. Alternatively, the whitening transform can be determined using preliminary reconstructed images. For example, the preliminary reconstructed images can be generated by performing filtered back-projection on the sinograms.

In step 840 of method 800, the whitening transform is used to transform the sinograms into the uncorrelated basis $\hat{U}_1^{(y)}$ and $\hat{U}_2^{(y)}$.

In process 850 of method 800, the reconstructed images $U_n^{(x)}$ are generated to minimize the PWLS objective function $$\underset{U_n^{(x)}}{\mathrm{argmin}}\left( \left(A_n U_n^{(x)} - \hat{U}_n^{(y)}\right)^T \sum_n^{-1} \left(A_n U_n^{(x)} - \hat{U}_n^{(y)}\right) \right) + \beta R_n(U_n^{(x)}),$$

wherein $\Sigma_n^{-1}$ is the inverse covariance matrix among the pixels of the sinogram of the $n^{th}$ representation in the uncorrelated basis, and $A_n$ is the system matrix of the $n^{th}$ representation. In certain implementations, the system matrix for all representations can be identical (i.e. $A_n=A_n$). In certain implementations, the regularizer $R_n(U_n^{(x)})$ can be the regularizer used in method 200 using the preliminary reconstructed images as the noisy images. In certain implementations, the regularizer $R_n(U_n^{(x)})$ can be given by $$R_n(U_n^{(x)}[k]) = \Delta_n^2[k] \prod_{m=1}^{2} \exp\left(-\frac{\hat{\Delta}_m^2[k]}{\delta_m^2}\right),$$

wherein $\hat{\Delta}_m[k]$ is a difference between nearby pixels of index k in the $m^{th}$ preliminary reconstructed image, $\delta_m$ is the edge-preserving parameter of the $m^{th}$ preliminary reconstructed image, and $\Delta_n[k]$ is a difference between nearby pixels of index k in the $m^{th}$ denoised image $U_m^{(x)}$. The edge-preserving parameters $\delta_m$ can depend on the contrast-to-noise ratio of the corresponding preliminary reconstructed images, similar to the edge-preserving parameters $\delta_m$ discussed for methods 200 and 500. The method of optimizing the objective function can be any known method, including, e.g., an SPS method, a separable quadratic surrogate method, an alternating direction method of multiplier method, an expectation maximization method, a gradient search method, an augmented Lagrangian method, etc.

In step 860 of method 800, the denoised images in the correlated basis are transformed back into the original basis, which is given by $$x = W^{-1} U^{(x)}.$$

Figure 9:
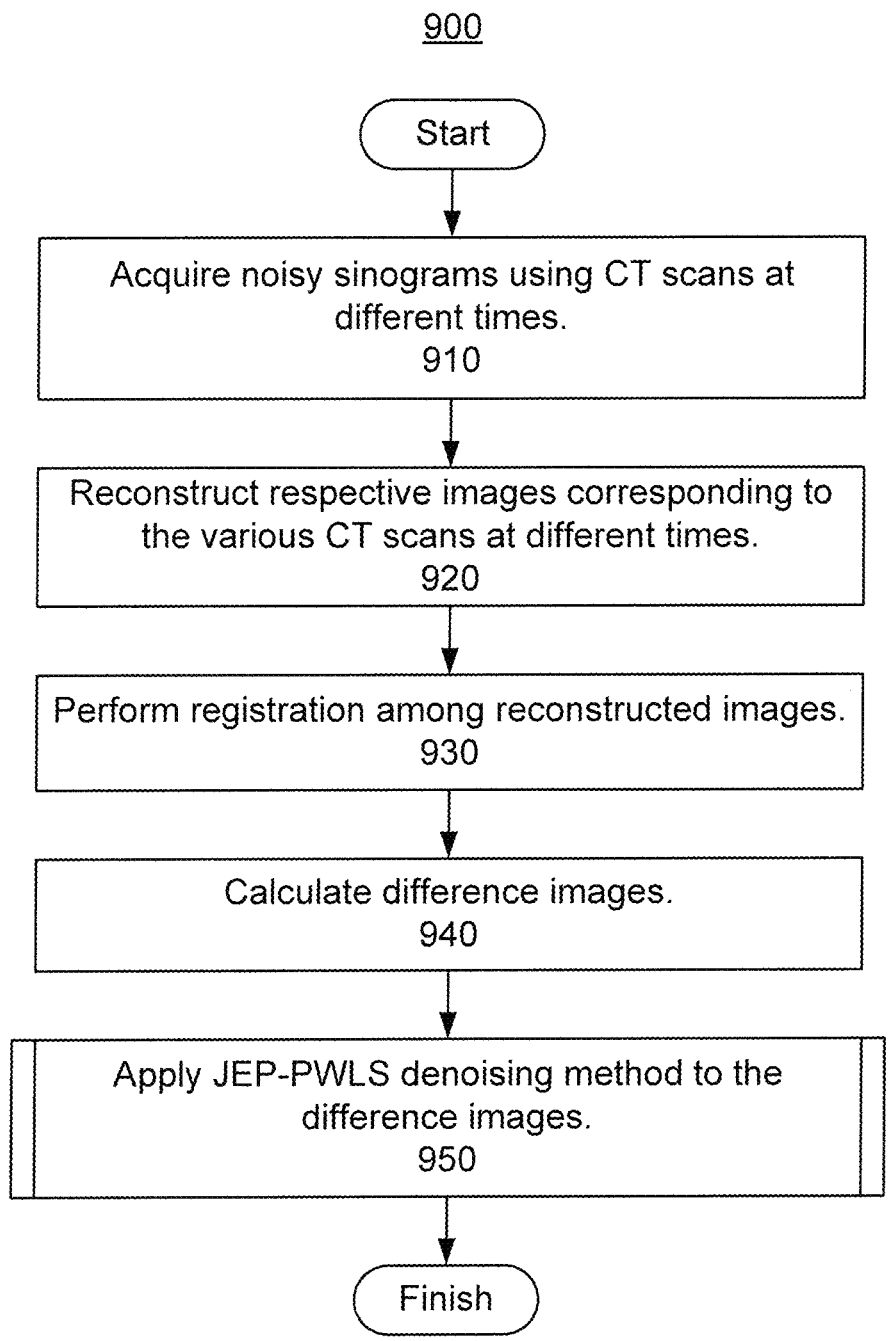
FIG. 9 shows a flow diagram of a method of denoising a series of reconstructed images which includes a difference image using an objective function having joint-edge-preserving term, according to one implementation.

FIG. 9 shows a flow diagram of a method 900 for denoising reconstructed images corresponding to a series of CT scans taken at different times.

In step 910 of method 900, projection data (i.e., projection datasets) for sinograms at different times are acquired. For example, the projection datasets can include the sinogram data for a first CT scan before a contrast agent is injected into a patient and the sinogram data for a second CT scan after a contrast agent is injected into the patient.

In step 920 of method 900, reconstructed images are generated for each CT scan. These images can be reconstructed using any known CT image reconstruction method, including any of the methods discussed above.

Figure 10:
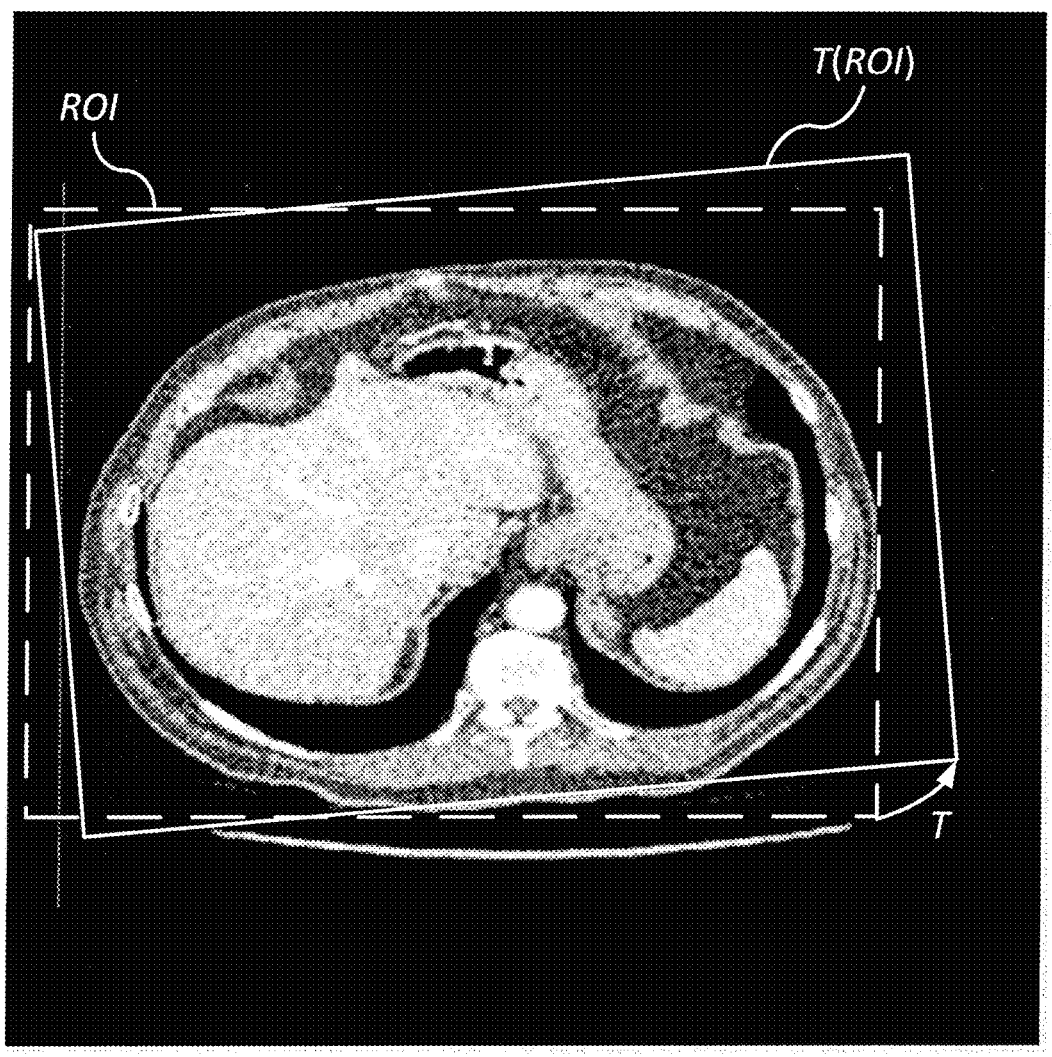
FIG. 10 shows a example of registration of a reconstructed image, according to one implementation.

In step 930 of method 900, registration is performed on the noisy images generated in step 920. FIG. 10 illustrates an example of registering an image using a spatial transformation (e.g., a rotation and a translation) to maximize an image correlation within a region of interest (ROI). The correlation can be between time-adjacent three-dimensional images of a four-dimensional image. The ROIs are pre-defined searching regions in a first three-dimensional image and a second three-dimensional image. FIG. 10 illustrates an example of the ROI of the second three-dimensional image. The ROI of the first three-dimensional image is the same size as the ROI of the second three-dimensional image. However, a patient's movement between the acquisition times of the first three-dimensional image and the second three-dimensional image can result in differences (e.g., translation offsets and rotation offsets) between the positions of the features within the two three-dimensional images. Therefore, a cross-correlation can be performed while transforming one ROI with respect to the other ROI to find a maximum cross-correlation value when the transformation causes the two three-dimensional images to be aligned.

Registration can be performed by finding the maximum value of the cross-correlation function between the first three-dimensional image and the second three-dimensional image, wherein the cross-correlation function can include both translations and rotations. Alternatively, registration can be performed by solving for the argument (i.e., transformation) that maximizes an overlap integral between the first three-dimensional image and the second three-dimensional image, wherein the argument of the transformation operator includes both translations and rotations.

A registered frame can be obtained by interpolation of the second three-dimensional image and mapping onto a grid corresponding to the transformed ROI. Any known search method can be used to optimize the transformation argument of the cross-correlation function.

Returning to FIG. 9, in step 940 of method 900, subtraction images are calculated. For example, in a series of more than two images, each image, except the first image can be subtracted from the first image in the time series to generate difference images. In the case of only two scans corresponding to before and after the injection of a contrast agent, the without-contrast-agent image can be subtracted from a without-contrast-agent image to generate the difference image.

In process 950 of method 900, the JEP-PWLS denoising method is applied to the difference images and the first image by finding the denoised images that solve the objective function $$\underset{x_n}{\mathrm{argmin}}\left((x_n-\hat{x}_n)^T\sum_n^{-1}(x_n-\hat{x}_n)\right)+\beta R_n(x_n),$$

wherein $\Sigma_n^{-1}$ is the inverse of a covariance matrix among the pixels of the image corresponding to the $n^{th}$ representation, $x_n$ is the $n^{th}$ denoised image, and $R_n(U_n^{(x)})$ is the regularizer. In certain implementations, the first representation $\hat{x}_1$ is the initial image for which a difference has not been taken, and all subsequent representations $\hat{x}_2, \hat{x}_3, \ldots \hat{x}_n$ correspond to the difference images. In certain implementations, the regularizer $R_n(x_n)$ can be given by $$R_n(x_n[k]) = \Delta_n^2[k]\prod_{m=1}^{2}\exp\left(-\frac{\hat{\Delta}_m^2[k]}{\delta_m^2}\right),$$

wherein $\hat{\Delta}_m[k]$ is a difference between nearby pixels of index k in the $m^{th}$ noisy representation $\hat{x}_m$, $\delta_m$ is the edge-preserving parameter of the $m^{th}$ noisy image $\hat{x}_m$, and $\Delta_n[k]$ is a difference between nearby pixels of index k in the $m^{th}$ denoised image $x_m$. The edge-preserving parameters $\delta_m$ can be tailored to the CNRs of the respective representations as discussed above for methods 200, 500, and 800.

Figure 11:
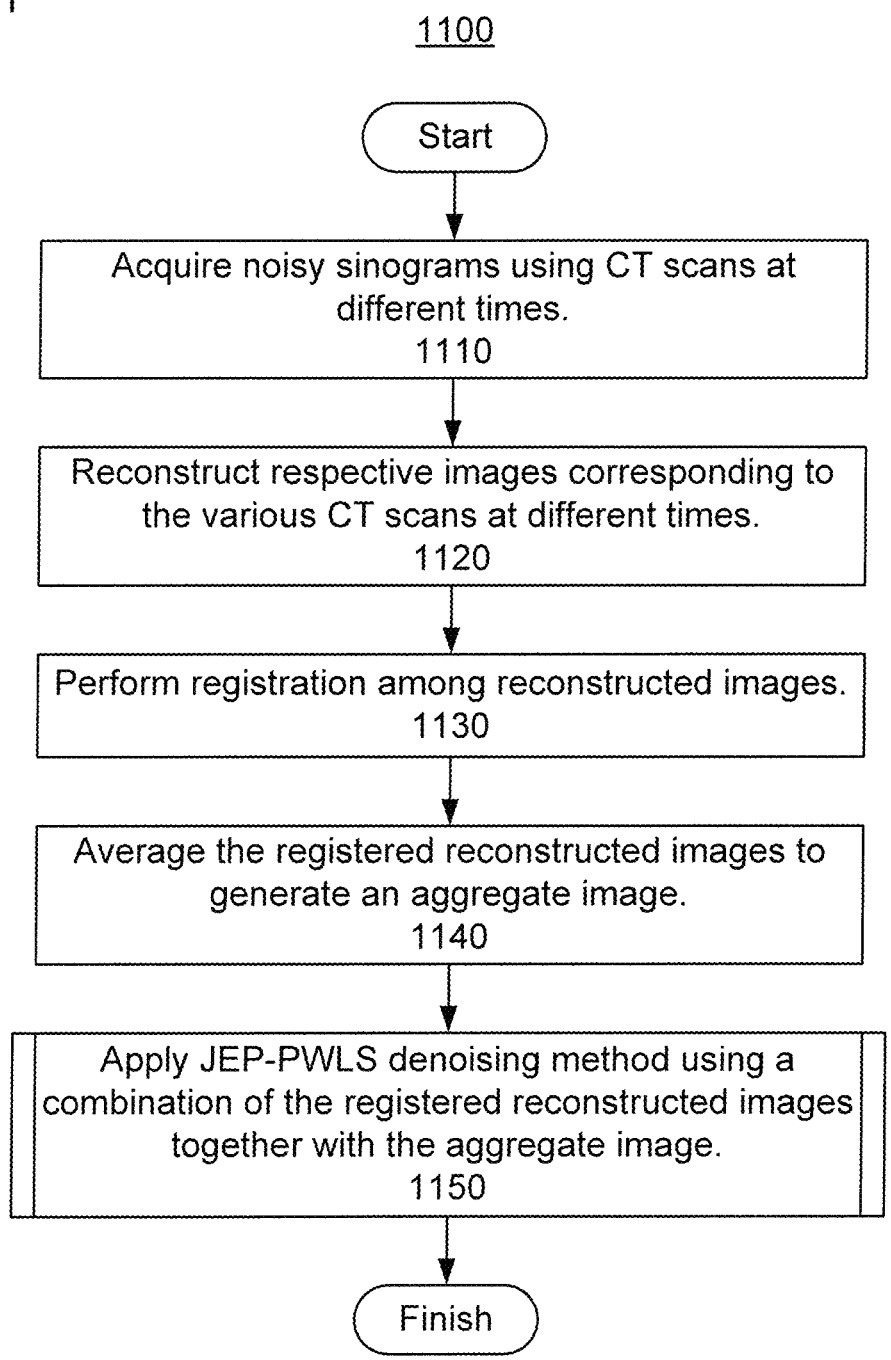
FIG. 11 shows a flow diagram of a method of denoising a series of reconstructed images which includes an aggregate image using an objective function having joint-edge-preserving term, according to one implementation.

FIG. 11 shows a flow diagram of a method 1100 for denoising reconstructed images corresponding to a series of CT scans taken at different times.

In step 1110 of method 1100, projection data for sinograms at different times are acquired, similar to step 910 of method 900.

In step 1120 of method 1100, reconstructed images are generated for each CT scan, similar to step 920 of method 900.

In step 1130 of method 1100, registration is performed on the noisy images generated in step 1120, similar to step 930 of method 900.

In step 1140 of method 1100, the registered images corresponding to the various representations are averaged to generate an aggregated image. As a result of averaging over the uncorrelated noise of the representation images, noise is suppressed in the aggregate image yielding a larger SNR and CNR for the aggregate image than the SNRs and CNRs of the constituent representation images. Consequently, in the JEP-PWLS denoising the method, the edge-preserving parameters $\delta_m$ corresponding to the aggregate image can be smaller, creating sharper edges.

In process 1150 of method 1100, the JEP-PWLS denoising method is applied to a combination of the aggregate image together with the various representation images. The JEP-PWLS denoising method is performed by finding the denoised images that solve the objective function $$\underset{x_n}{\mathrm{argmin}}\left((x_n-\hat{x}_n)^T\sum_n^{-1}(x_n-\hat{x}_n)\right)+\beta R_n(x_n),$$

wherein $\Sigma_n^{-1}$ is the inverse of a covariance matrix among the pixels of various images corresponding to the aggregate image and the separate representation images, $x_n$ is the $n^{th}$ image of the combination of the aggregate image and the separate representation images, and $R_n(x_n)$ is the regularizer. The regularizer $R_n(x_n)$ can be given by an expression similar to the regularizers in method 200, 500, 800, and 900.

Figure 12:
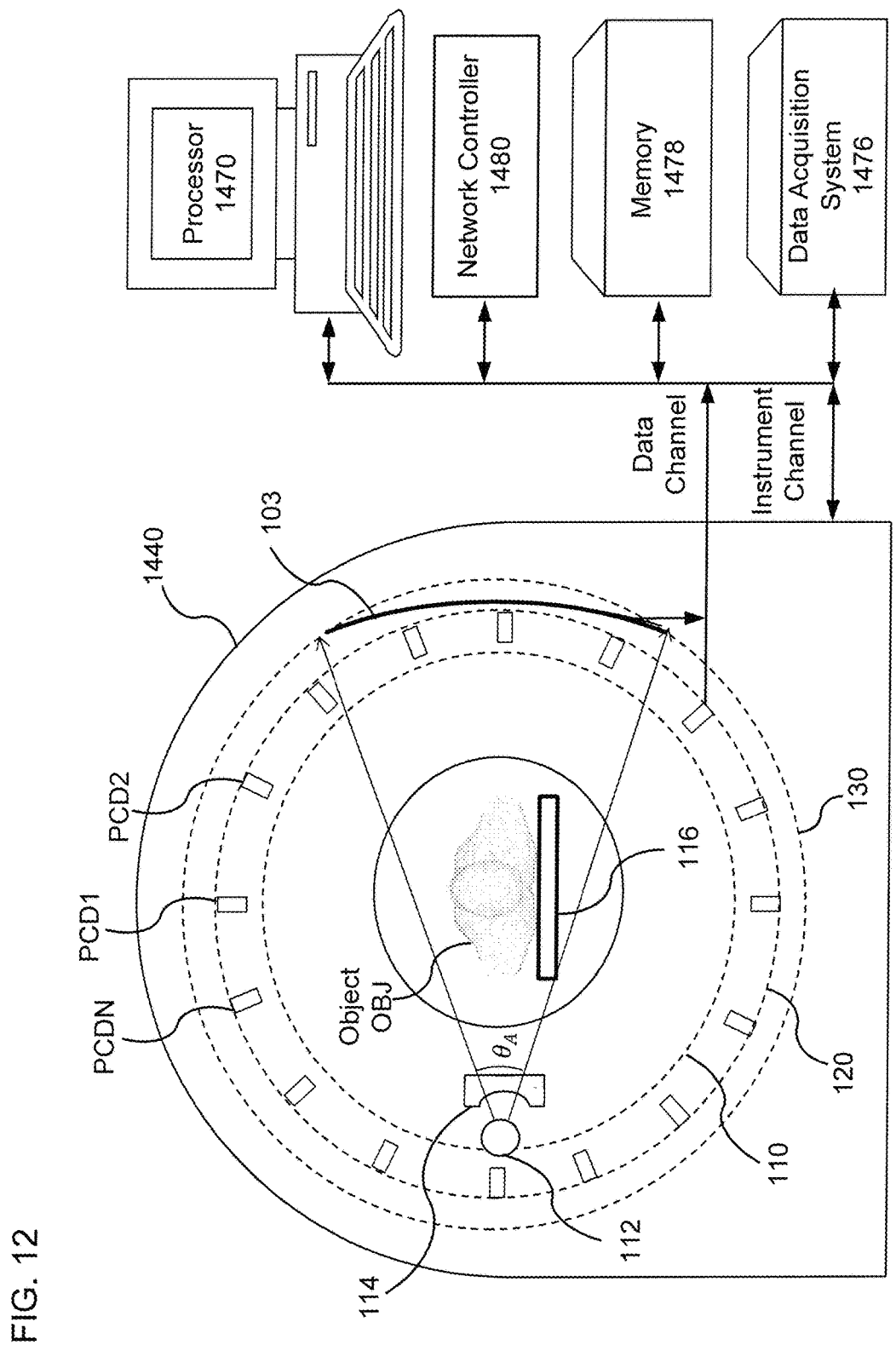
FIG. 12 shows a schematic of an implementation of a CT scanner.

FIG. 12 shows a computed tomography (CT) scanner having both energy-integrating detectors arranged in a third-generation geometry and PCDs arranged in a fourth-generation geometry. Illustrated in FIG. 12 is an implementation for placing the PCDs in a predetermined fourth-generation geometry in combination with a detector unit 103 in a predetermined third-generation geometry in a CT scanner system. The diagram illustrates relative positions among the X-ray source 112, the collimator/filter 114, the X-ray detector 103, and the photon-counting detectors PCD1 through PCDN.

In addition to the configuration of the X-ray source 112 and the detectors including the detector unit 103 and the PCDS show in FIG. 12, other types and combinations of X-ray detectors and X-ray source can be used to obtain the projection data. For example, either the detector unit 103 or the PCDS could be omitted from the scanner shown in FIG. 12 and the scanner could still obtain projection data, albeit different from the projection data obtained using the complete system shown in FIG. 12. Further, kV switching could be used with energy-integrating detectors or PCDs. In certain implementations, the PCDS can be direct X-ray detectors using semiconductors to convert the X-rays directly to photoelectrons without first generating scintillation photons. Additionally, in certain implementations, a broadband X-ray source can be used with spectrally-resolving X-ray detectors. These spectrally-resolving X-ray detectors can include PCDs in any configurations (e.g., a predetermined third-generation geometry or a predetermined fourth-generation geometry) or energy-integrating detectors preceded by respective spectral filters. In certain implementations, the X-ray source can include multiple narrow-band X-ray sources, such as in a dual source CT scanner. In general, any known combination of detector type and configuration together with any known type or combination of X-ray sources can be used to generate the projection data.

Returning to FIG. 12, FIG. 12 also shows circuitry and hardware for acquiring, storing, processing, and distributing X-ray projection data. The circuitry and hardware include: a processor 1470, a network controller 1480, a memory 1478, and a data acquisition system 1476.

In one alternative implementation, the CT scanner includes PCDs but does not include the energy-integrating detector unit 103.

As the X-ray source 112 and the detector unit 103 are housed in a gantry 1440 and rotate around circular paths 110 and 130 respectively, the photon-counting detectors PCDs and the detector unit 103 respectively detects the transmitted X-ray radiation during data acquisition. The photon-counting detectors PCD1 through PCDN intermittently detect the X-ray radiation that has been transmitted and individually output a count value representing a number of photons, for each of the predetermined energy bins. On the other hand, the detector elements in the detector unit 103 continuously detect the X-ray radiation that has been transmitted and output the detected signals as the detector unit 103 rotates. In one implementation, the detector unit 103 has densely placed energy-integrating detectors in predetermined channel and segment directions on the detector unit surface.

In one implementation, the X-ray source 112, the PCDs and the detector unit 103 collectively form three predetermined circular paths that differ in radius. At least one X-ray source 112 rotates along a first circular path 110 while the photon-counting detectors are sparsely placed along a second circular path 120. Further, the detector unit 103 travels along a third circular path 130. The first circular path 110, second circular path 120, and third circular path 130 can be determined by annular rings that are rotatably mounted to the gantry 1440.

Additionally, alternative embodiments can be used for placing the photon-counting detectors in a predetermined fourth-generation geometry in combination with the detector unit in a predetermined third-generation geometry in the CT scanner.

In one implementation, the X-ray source 112 is optionally a single energy source. In another implementation, the X-ray source 112 is configured to perform a kV-switching function for emitting X-ray radiation at a predetermined high-level energy and at a predetermined low-level energy. In still another alternative embodiment, the X-ray source 112 is a single source emitting a broad spectrum of X-ray energies. In still another embodiment, the X-ray source 112 includes multiple X-ray emitters with each emitter being spatially and spectrally distinct.

The detector unit 103 can use energy integrating detectors such as scintillation elements with photo-multiplier tubes or avalanche photo-diodes to detect the resultant scintillation photons from scintillation events resulting from the X-ray radiation interacting with the scintillator elements. The scintillator elements can be crystalline, an organic liquid, a plastic, or other know scintillator.

The PCDs can use a direct X-ray radiation detectors based on semiconductors, such as cadmium telluride (CdTe), cadmium zinc telluride (CZT), silicon (Si), mercuric iodide ($HgI_2$), and gallium arsenide (GaAs).

The CT scanner also includes a data channel that routes projection measurement results from the photon-counting detectors and the detector unit 103 to a data acquisition system 1476, a processor 1470, memory 1478, network controller 1480. The data acquisition system 1476 controls the acquisition, digitization, and routing of projection data from the detectors. The data acquisition system 1476 also includes radiography control circuitry to control the rotation of the annular rotating frames 110 and 130. In one implementation data acquisition system 1476 will also control the movement of the bed 116, the operation of the X-ray source 112, and the operation of the X-ray detectors 103. The data acquisition system 1476 can be a centralized system or alternatively it can be a distributed system. In an implementation, the data acquisition system 1476 is integrated with the processor 1470. The processor 1470 performs functions including reconstructing images from the projection data, pre-reconstruction processing of the projection data, and post-reconstruction processing of the image data. The processor 1470 also performs the functions and methods described herein.

The pre-reconstruction processing of the projection data can include correcting for detector calibrations, detector nonlinearities, polar effects, noise balancing, and material decomposition. Additionally, the pre-reconstruction processing can include denoising the sinogram data using method 500.

Post-reconstruction processing can include filtering and smoothing the image, volume rendering processing, and image difference processing as needed. Additionally, the Post-reconstruction processing can include denoising the reconstructed images using one of method 200, 900, and 1100.

The image-reconstruction process can be performed using filtered back-projection, iterative-image-reconstruction methods, or stochastic-image-reconstruction methods. Additionally, the image-reconstruction processing can include a combined process of reconstructing and denoising the reconstructed images using method 800.

Both the processor 1470 and the data acquisition system 1476 can make use of the memory 1476 to store, e.g., projection data, reconstructed images, calibration data and parameters, and computer programs.

The processor 1470 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the reconstruction processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display. The display can be an LCD display, CRT display, plasma display, OLED, LED or any other display known in the art.

The memory 1478 can be a hard disk drive, CD-ROM drive, DVD drive, FLASH drive, RAM, ROM or any other electronic storage known in the art.

The network controller 1480, such as an Intel Ethernet PRO network interface card from Intel Corporation of America, can interface between the various parts of the CT scanner. Additionally, the network controller 1480 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   circuitry configured to
      obtain a plurality of projection datasets representing intensities of X-ray radiation detected at a plurality of detector elements of an X-ray computed tomography (CT) scanner,
      denoise a first projection dataset of the plurality of projection datasets, using an objective function that includes a joint-edge-preserving regularizer that depends on at least two projection datasets of the plurality of projection datasets, to generate a first denoised projection dataset corresponding to the first projection dataset, the joint-edge-preserving regularizer including a product of Gaussian terms including respective edge-preserving parameters corresponding to the at least two projection datasets, and the respective edge-preserving parameters being inversely related to respective contrast-to-noise ratios of the at least two projection datasets, and
      reconstruct a first denoised image using the first denoised projection dataset; and
   a display configured to display the first denoised image.

2. The apparatus according to claim 1, wherein the circuitry is further configured to obtain the plurality of projection datasets, which correspond respectively to at least one of energy bands of the X-ray radiation detected at the plurality of detector elements and components of a material decomposition.

3. The apparatus according to claim 1, wherein the circuitry is further configured to
   denoise each of the plurality of projection datasets using respective objective functions that include respective joint-edge-preserving regularizers to generate a plurality of denoised projection datasets, wherein each joint-edge-preserving regularizer depends on all projection datasets of the plurality of projection datasets, and
   reconstruct a plurality of denoised images from the plurality of denoised projection dataset, wherein the plurality of denoised images includes the first denoised image.

4. An apparatus, comprising:
   circuitry configured to
      obtain, using X-ray computed tomography (CT), a plurality of images representing an absorption of X-ray radiation, and
      denoise a first image of the plurality of images, using an objective function that includes a regularizer that depends on at least two images of the plurality of images, to generate a first denoised image corresponding to the first image, the regularizer including a product of Gaussian terms including respective edge-preserving parameters corresponding to the at least two images, and the respective edge-preserving parameters being inversely related to respective contrast-to-noise ratios of the at least two images; and
   a display configured to display the first denoised image.

5. The apparatus according to claim 4, wherein the circuitry is further configured to denoise the first image of the plurality of images using the regularizer, which is a joint-edge-preserving regularizer.

6. The apparatus according to claim 4, wherein the circuitry is further configured to obtain the plurality of images, which correspond respectively to at least one of energy bands of the X-ray radiation detected at a plurality of detector elements and components of a material decomposition.

7. The apparatus according to claim 4, wherein the circuitry is further configured to denoise the first image using the objective function, which includes a penalized weighted least squares term.

8. The apparatus according to claim 4, wherein the circuitry is further configured to denoise each of the plurality of images using respective objective functions that include corresponding joint-edge-preserving regularizers, each joint-edge-preserving regularizer of the joint-edge-preserving regularizers depending on all of the images of the plurality of images, to generate a plurality of denoised images.

9. The apparatus according to claim 4, wherein the circuitry is further configured to
   transform, prior to the denoising of the image, the plurality of images from an original basis to an uncorrelated basis using a whitening transform, and
   transform, after the denoising of the image, the first denoised image from the uncorrelated basis to the original basis using an inverse whitening transform.

10. The apparatus according to claim 4, wherein the circuitry is further configured to obtain the plurality of images by reconstructing respective images of the plurality of images from corresponding projection datasets, wherein respective images of the plurality of images correspond respectively to acquisition times of the projection datasets.

11. The apparatus according to claim 4, wherein the circuitry is further configured to obtain the plurality of images, which includes a reconstructed image and a difference image, the reconstructed image being reconstructed from a projection dataset, and the difference image including a difference between the reconstructed image and another image that is reconstructed from another projection dataset.

12. The apparatus according to claim 4, wherein the circuitry is further configured to obtain the plurality of images, which includes an average image that is an average of other images of the plurality of images.

13. An apparatus, comprising:
   an X-ray source radiating X-rays;
   a plurality of detector elements, each detector element of the plurality of detector elements being configured to detect the radiated X-rays, wherein the plurality of detector elements is configured to generate projection data of a plurality of projection datasets;
   the circuitry according to claim 4, and the circuitry is further configured to reconstruct the plurality of images from the plurality of projection datasets; and
   a display configured to display the first denoised image.

14. The apparatus according to claim 4, wherein the circuitry is further configured to denoise the first image of the plurality of images using the regularizer, which includes a product between a first term and a second term, wherein
   the first term is the product of the Gaussian terms, each Gaussian term being a function of a difference between nearby pixels of a corresponding image of the at least two images, and each Gaussian term having a width that is proportional to an edge-preserving parameter of the corresponding image of the at least two images, and the second term is a square of a difference between nearby pixels of the first denoised image.

15. The apparatus according to claim 14, wherein the circuitry is further configured to denoise the first image of the plurality of images using the Gaussian terms in which a first edge-preserving parameter corresponds to a first image of the at least two images and a second edge-preserving parameter corresponds to a second image of the at least two images, wherein
the first edge-preserving parameter is greater than the second edge-preserving parameter when a contrast-to-noise ratio of the first image of the at least two images is less than a contrast-to-noise ratio of the second image of the at least two images, and
the first edge-preserving parameter is less than the second edge-preserving parameter when the contrast-to-noise ratio of the first image of the at least two images is greater than the contrast-to-noise ratio of the second image of the at least two images.

16. The apparatus according to claim 14, wherein the circuitry is further configured to denoise the first image of the plurality of images using the regularizer such that the respective edge-preserving parameters corresponding to the Gaussian terms of the regularizer are inversely related to the respective contrast-to-noise ratios of the corresponding images of the at least two images.

17. An apparatus, comprising:
circuitry configured to
obtain a plurality of projection datasets representing an intensity of X-ray radiation detected at a plurality of detector elements of an X-ray computed tomography (CT) scanner,
calculate a regularizer of an objective function, the regularizer including a joint-edge-preserving term which includes a product of Gaussian terms which are respectively functions of a difference between nearby pixels of corresponding images reconstructed from the plurality of projection datasets, and the edge-preserving term being inversely related to respective contrast-to-noise ratios of the images reconstructed from the plurality of projection datasets, and
reconstruct a plurality of denoised image corresponding to the plurality of projection datasets by optimizing the objective function which includes the regularizer; and
a display configured to display the first denoised image.

18. A method, comprising:
obtaining, using X-ray computed tomography (CT), a plurality of images representing an absorption of X-ray radiation;
denoising an image of the plurality of images, using an objective function that includes a joint-edge-preserving regularizer that depends on at least two images of the plurality of images, to generate a first denoised image, the joint-edge-preserving regularizer including a product of Gaussian terms including respective edge-preserving parameters corresponding to the at least two projection datasets, and the respective edge-preserving parameters being inversely related to respective contrast-to-noise ratios of the at least two projection datasets; and
controlling a display to display the first denoised image, wherein
the images of the plurality images are labeled by respectively corresponding to at least one of energy bands of the X-ray radiation, components of a material decomposition, and acquisition times at which respective projection datasets corresponding to the images of the plurality of images are generated.

19. A method, comprising:
obtaining, using X-ray computed tomography (CT), a plurality of projection datasets representing an intensity of X-ray radiation detected at a plurality of detector elements;
calculating a regularizer of an objective function, the regularizer including a joint-edge-preserving term which includes a product of Gaussian terms which are respectively functions of a difference between nearby pixels of corresponding images reconstructed from the plurality of projection datasets, and the edge-preserving term being inversely related to respective contrast-to-noise ratios of the images reconstructed from the plurality of projection datasets; and
reconstructing a plurality of denoised images corresponding to the plurality of projection datasets by optimizing the objective function which includes the regularizer, wherein
the projection datasets of the plurality of projection datasets respectively correspond to at least one of energy bands of the X-ray radiation, components of a material decomposition, and acquisition times at which respective projection datasets of the plurality of projection datasets are generated.

* * * * *